(12) United States Patent
Muhlenkamp et al.

(10) Patent No.: US 11,958,249 B2
(45) Date of Patent: Apr. 16, 2024

(54) RECLAMATION SYSTEM FOR ADDITIVE MANUFACTURING

(71) Applicant: General Electric Company, Schenectady, NY (US)

(72) Inventors: Trent William Muhlenkamp, Cincinnati, OH (US); Christopher David Barnhill, Cincinnati, OH (US); Meredith Elissa Dubelman, Liberty Township, OH (US); Carlos H. Bonilla, West Chester, OH (US); Brian Thomas Thompson, Loveland, OH (US); John Thomas Sterle, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/837,267

(22) Filed: Jun. 10, 2022

(65) Prior Publication Data
US 2022/0410481 A1 Dec. 29, 2022

Related U.S. Application Data

(60) Provisional application No. 63/214,294, filed on Jun. 24, 2021.

(51) Int. Cl.
*B29C 64/357* (2017.01)
*B29C 64/124* (2017.01)
(Continued)

(52) U.S. Cl.
CPC .......... *B29C 64/357* (2017.08); *B29C 64/124* (2017.08); *B33Y 10/00* (2014.12); *B33Y 40/00* (2014.12)

(58) Field of Classification Search
CPC ......... B33Y 10/00; B33Y 30/00; B33Y 40/00; B33Y 40/20; B29C 64/124; B29C 64/129;
(Continued)

(56) References Cited

U.S. PATENT DOCUMENTS

| 1,990,749 A | 2/1935 | Phillips et al. |
| 2,259,517 A | 10/1941 | Drenkard, Jr. |

(Continued)

FOREIGN PATENT DOCUMENTS

| CN | 101628477 A | 1/2010 |
| CN | 103210344 A | 7/2013 |

(Continued)

OTHER PUBLICATIONS

Admatec, Admaflex 300 DLP 3D Printer, Specifications, Features, Design and Functions, Netherlands, 2 Pages. Retrieved Nov. 5, 2020 from Webpage: https://admateceurope.com/files/10fla369c2239943e6506f27ba920bd4dd9359078e744369695ab6ffbde75c6c?filename=Admaflex%20300%20brochure.pdf&sig=hQvDlxkSmFOZwjM.

(Continued)

*Primary Examiner* — Thu Khanh T. Nguyen
*Assistant Examiner* — Jamel M Nelson
(74) *Attorney, Agent, or Firm* — Dority & Manning, P.A.

(57) ABSTRACT

A reclamation system for an additive manufacturing apparatus can include a collection structure configured to remove at least a portion of the resin from a foil. A containment vessel can be configured to retain the resin removed from the foil. A drain can direct the resin from the containment vessel to a reservoir.

13 Claims, 13 Drawing Sheets

(51) Int. Cl.
*B33Y 10/00* (2015.01)
*B33Y 40/00* (2020.01)

(58) Field of Classification Search
CPC ... B29C 64/135; B29C 64/245; B29C 64/214; B29C 64/357
See application file for complete search history.

(56) References Cited

U.S. PATENT DOCUMENTS

| | | |
|---|---|---|
| 3,264,103 A | 8/1966 | Cohen et al. |
| 3,395,014 A | 7/1968 | Cohen et al. |
| 3,486,482 A | 12/1969 | Hunger |
| 3,710,846 A | 1/1973 | Properzi |
| 3,875,067 A | 4/1975 | DeSorgo et al. |
| 3,991,149 A | 11/1976 | Hurwitt |
| 4,041,476 A | 8/1977 | Swainson |
| 4,292,827 A | 10/1981 | Waugh |
| 4,575,330 A | 3/1986 | Hull |
| 4,752,498 A | 6/1988 | Fudim |
| 4,945,032 A | 7/1990 | Murphy et al. |
| 5,015,312 A | 5/1991 | Kinzie |
| 5,026,146 A | 6/1991 | Hug et al. |
| 5,031,120 A | 7/1991 | Pomerantz et al. |
| 5,058,988 A | 10/1991 | Spence et al. |
| 5,059,021 A | 10/1991 | Spence et al. |
| 5,088,047 A | 2/1992 | Bynum |
| 5,094,935 A | 3/1992 | Vassiliou et al. |
| 5,096,530 A | 3/1992 | Cohen |
| 5,104,592 A | 4/1992 | Hull et al. |
| 5,123,734 A | 6/1992 | Spence et al. |
| 5,126,259 A | 6/1992 | Weiss et al. |
| 5,126,529 A | 6/1992 | Weiss et al. |
| 5,133,987 A | 7/1992 | Spence et al. |
| 5,162,167 A | 11/1992 | Minh et al. |
| 5,174,931 A | 12/1992 | Almquist et al. |
| 5,175,077 A | 12/1992 | Grossa |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,236,326 A | 8/1993 | Grossa |
| 5,236,637 A | 8/1993 | Hull |
| 5,236,812 A | 8/1993 | Vassiliou et al. |
| 5,247,180 A | 9/1993 | Mitcham et al. |
| 5,248,456 A | 9/1993 | Evans, Jr. et al. |
| 5,258,146 A | 11/1993 | Almquist et al. |
| 5,314,711 A | 5/1994 | Baccini |
| 5,340,656 A | 8/1994 | Sachs et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,460,758 A | 10/1995 | Langer et al. |
| 5,496,682 A | 3/1996 | Quadir et al. |
| 5,610,824 A | 3/1997 | Vinson et al. |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,688,464 A | 11/1997 | Jacobs et al. |
| 5,693,144 A | 12/1997 | Jacobs et al. |
| 5,697,043 A | 12/1997 | Baskaran et al. |
| 5,717,599 A | 2/1998 | Menhennett et al. |
| 5,718,279 A | 2/1998 | Saoth et al. |
| 5,746,833 A | 5/1998 | Gerhardt |
| 5,764,521 A | 6/1998 | Batchelder et al. |
| 5,807,437 A | 9/1998 | Sachs et al. |
| 5,824,184 A | 10/1998 | Kamijo et al. |
| 5,851,465 A | 12/1998 | Bredt |
| 5,866,058 A | 2/1999 | Batchelder et al. |
| 5,895,547 A | 4/1999 | Kathrein et al. |
| 5,900,207 A | 5/1999 | Danforth et al. |
| 5,939,008 A | 8/1999 | Comb et al. |
| 5,940,674 A | 8/1999 | Sachs et al. |
| 5,945,058 A | 8/1999 | Manners et al. |
| 5,968,561 A | 10/1999 | Batchelder et al. |
| 5,980,813 A | 11/1999 | Narang et al. |
| 5,985,204 A | 11/1999 | Otsuka et al. |
| 6,051,179 A | 4/2000 | Hagenau |
| 6,067,480 A | 5/2000 | Stuffle et al. |
| 6,068,367 A | 5/2000 | Fabbri |
| 6,110,411 A | 8/2000 | Clausen et al. |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,375,451 B1 | 4/2002 | Robinson et al. |
| 6,376,148 B1 | 4/2002 | Liu et al. |
| 6,391,245 B1 | 5/2002 | Smith |
| 6,399,010 B1 | 6/2002 | Guertin et al. |
| 6,401,002 B1 | 6/2002 | Jang et al. |
| 6,403,002 B1 | 6/2002 | van der Geest |
| 6,436,520 B1 | 8/2002 | Yamamoto |
| 6,450,393 B1 | 9/2002 | Doumanidis et al. |
| 6,463,349 B2 | 10/2002 | White et al. |
| 6,471,800 B2 | 10/2002 | Jang et al. |
| 6,500,378 B1 | 12/2002 | Smith |
| 6,512,869 B1 | 1/2003 | Imayama et al. |
| 6,543,506 B1 | 4/2003 | Phillips |
| 6,575,218 B1 | 6/2003 | Burns et al. |
| 6,596,224 B1 | 7/2003 | Sachs et al. |
| 6,641,897 B2 | 11/2003 | Gervasi |
| 6,649,113 B1 | 11/2003 | Manners et al. |
| 6,660,209 B2 | 12/2003 | Leyden et al. |
| 6,668,892 B2 | 12/2003 | Vasilakes et al. |
| 6,682,598 B1 | 1/2004 | Steinmueller et al. |
| 6,780,368 B2 | 8/2004 | Liu et al. |
| 6,786,711 B2 | 9/2004 | Koch et al. |
| 6,838,035 B1 | 1/2005 | Ederer et al. |
| 6,850,334 B1 | 2/2005 | Gothait |
| 6,852,272 B2 | 2/2005 | Artz et al. |
| 6,896,839 B2 | 5/2005 | Kubo et al. |
| 6,914,406 B1 | 7/2005 | Wilkes et al. |
| 6,930,144 B2 | 8/2005 | Oriakhi |
| 6,947,058 B1 | 9/2005 | Elmquist |
| 6,966,960 B2 | 11/2005 | Boyd et al. |
| 6,974,521 B2 | 12/2005 | Schermer |
| 6,986,654 B2 | 1/2006 | Imiolek et al. |
| 7,008,209 B2 | 3/2006 | Iskra et al. |
| 7,016,738 B1 | 3/2006 | Karunasiri |
| 7,022,207 B2 | 4/2006 | Hirsch |
| 7,045,738 B1 | 5/2006 | Kovacevic et al. |
| 7,052,263 B2 | 5/2006 | John |
| 7,070,250 B2 | 7/2006 | Lester et al. |
| 7,074,029 B2 | 7/2006 | Stockwell et al. |
| 7,084,875 B2 | 8/2006 | Plante |
| 7,087,109 B2 | 8/2006 | Bredr et al. |
| 7,158,849 B2 | 1/2007 | Huang et al. |
| 7,164,420 B2 | 1/2007 | Ard |
| 7,195,472 B2 | 3/2007 | John |
| 7,261,542 B2 | 8/2007 | Hickerson et al. |
| 7,270,528 B2 | 9/2007 | Sherwood |
| 7,300,613 B2 | 11/2007 | Sano et al. |
| 7,351,304 B2 | 4/2008 | Liang et al. |
| 7,402,219 B2 | 7/2008 | Graf |
| 7,438,846 B2 | 10/2008 | John |
| 7,455,804 B2 | 11/2008 | Patel et al. |
| 7,520,740 B2 | 4/2009 | Wahlstrom et al. |
| 7,550,518 B2 | 6/2009 | Bredt et al. |
| 7,555,726 B2 | 6/2009 | Kurtenbach et al. |
| 7,569,174 B2 | 8/2009 | Ruatta et al. |
| 7,572,403 B2 | 8/2009 | Gu et al. |
| 7,575,682 B2 | 8/2009 | Olsta et al. |
| 7,578,958 B2 | 8/2009 | Patel et al. |
| 7,614,866 B2 | 11/2009 | Sperry et al. |
| 7,614,886 B2 | 11/2009 | Sperry et al. |
| 7,636,610 B2 | 12/2009 | Schillen et al. |
| 7,698,947 B2 | 4/2010 | Sarr |
| 7,706,910 B2 | 4/2010 | Hull et al. |
| 7,742,060 B2 | 6/2010 | Maillot |
| 7,758,799 B2 | 7/2010 | Hull et al. |
| 7,767,132 B2 | 8/2010 | Patel et al. |

(56) References Cited

U.S. PATENT DOCUMENTS

| | | |
|---|---|---|
| 7,771,183 B2 | 8/2010 | Hull et al. |
| 7,780,429 B2 | 8/2010 | Kikuchi |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,845,930 B2 | 12/2010 | Shkolnik et al. |
| 7,867,302 B2 | 1/2011 | Nevoret et al. |
| 7,892,474 B2 | 2/2011 | Shkolnik et al. |
| 7,894,921 B2 | 2/2011 | John et al. |
| 7,931,460 B2 | 4/2011 | Scott et al. |
| 7,962,238 B2 | 6/2011 | Shkolnik et al. |
| 7,964,047 B2 | 6/2011 | Ishida |
| 7,995,073 B1 | 8/2011 | Shemanarev et al. |
| 8,003,040 B2 | 8/2011 | El-Siblani |
| 8,071,055 B2 | 9/2011 | Davidson et al. |
| 8,029,642 B2 | 10/2011 | Hagman |
| 8,048,261 B2 | 11/2011 | McCowin |
| 8,070,473 B2 | 12/2011 | Kozlak |
| 8,105,066 B2 | 1/2012 | Sperry et al. |
| 8,110,135 B2 | 2/2012 | El-Siblani |
| 8,126,580 B2 | 2/2012 | El-Siblani et al. |
| 8,157,908 B2 | 4/2012 | Williams |
| 8,185,229 B2 | 5/2012 | Davidson |
| 8,096,262 B2 | 6/2012 | Ederer et al. |
| 8,191,500 B2 | 6/2012 | Dohring et al. |
| 8,211,226 B2 | 7/2012 | Bredt et al. |
| 8,232,444 B2 | 7/2012 | Bar Nathan et al. |
| 8,259,103 B2 | 9/2012 | Glueck et al. |
| 8,269,767 B2 | 9/2012 | Glueck et al. |
| 8,282,866 B2 | 10/2012 | Hiraide |
| 8,326,024 B2 | 12/2012 | Shkolnik |
| 8,372,330 B2 | 2/2013 | El-Siblani et al. |
| 8,394,313 B2 | 3/2013 | El-Siblani et al. |
| 8,413,578 B2 | 4/2013 | Doyle |
| 8,424,580 B2 | 4/2013 | Anderson et al. |
| 8,444,903 B2 | 5/2013 | Lyons et al. |
| 8,454,879 B2 | 6/2013 | Kuzusako et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,513,562 B2 | 8/2013 | Bichsel |
| 8,522,159 B2 | 8/2013 | Kurtenbach et al. |
| 8,540,501 B2 | 9/2013 | Yasukochi |
| 8,568,646 B2 | 10/2013 | Wang et al. |
| 8,568,649 B1 | 10/2013 | Balistreri et al. |
| 8,593,083 B2 | 11/2013 | Firhoj et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,658,076 B2 | 2/2014 | El-Siblani |
| 8,663,568 B2 | 3/2014 | Bar Nathan et al. |
| 8,666,142 B2 | 3/2014 | Shkolnik et al. |
| 8,703,037 B2 | 4/2014 | Hull et al. |
| 8,715,832 B2 | 5/2014 | Ederer et al. |
| 8,718,522 B2 | 5/2014 | Chillscyzn et al. |
| 8,737,862 B2 | 5/2014 | Manico et al. |
| 8,741,194 B1 | 6/2014 | Ederer et al. |
| 8,741,203 B2 | 6/2014 | Liska et al. |
| 8,744,184 B2 | 6/2014 | Ameline et al. |
| 8,761,918 B2 | 6/2014 | Silverbrook |
| 8,801,418 B2 | 8/2014 | El-Siblani et al. |
| 8,805,064 B2 | 8/2014 | Ameline et al. |
| 8,815,143 B2 | 8/2014 | John et al. |
| 8,844,133 B2 | 8/2014 | Fuller |
| 8,845,316 B2 | 9/2014 | Schillen et al. |
| 8,845,953 B1 | 9/2014 | Balistreri et al. |
| 8,862,260 B2 | 10/2014 | Shkolnik et al. |
| 8,872,024 B2 | 10/2014 | Jamar et al. |
| 8,873,024 B2 | 10/2014 | Jamar et al. |
| 8,876,513 B2 | 11/2014 | Lim et al. |
| 8,877,115 B2 | 11/2014 | Elsey |
| 8,888,480 B2 | 11/2014 | Yoo et al. |
| 8,915,728 B2 | 12/2014 | Mironets et al. |
| 8,926,304 B1 | 1/2015 | Chen |
| 8,932,511 B2 | 1/2015 | Napendensky |
| 8,968,625 B2 | 3/2015 | Tan |
| 8,974,717 B2 | 3/2015 | Maguire et al. |
| 8,991,211 B1 | 3/2015 | Arlotti et al. |
| 8,992,816 B2 | 3/2015 | Jonasson et al. |
| 8,998,601 B2 | 4/2015 | Busato |
| 9,011,982 B2 | 4/2015 | Muller et al. |
| 9,031,680 B2 | 5/2015 | Napadensky |
| 9,063,376 B2 | 6/2015 | Mizumura |
| 9,064,922 B2 | 6/2015 | Nakajima et al. |
| 9,067,359 B2 | 6/2015 | Rohner et al. |
| 9,067,360 B2 | 6/2015 | Wehning et al. |
| 9,067,361 B2 | 6/2015 | El-Siblani |
| 9,073,260 B2 | 7/2015 | El-Siblani et al. |
| 9,079,357 B2 | 7/2015 | Ebert et al. |
| 9,101,321 B1 | 8/2015 | Kiesser |
| 9,149,986 B2 | 10/2015 | Huang et al. |
| 9,150,032 B2 | 10/2015 | Roof et al. |
| 9,153,052 B2 | 10/2015 | Ameline et al. |
| 9,159,155 B2 | 10/2015 | Andersen |
| 9,186,847 B2 | 11/2015 | Fruth et al. |
| 9,193,112 B2 | 11/2015 | Ohkusa et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,221,100 B2 | 12/2015 | Schwarze et al. |
| 9,233,504 B2 | 1/2016 | Douglas et al. |
| 9,248,600 B2 | 2/2016 | Goodman et al. |
| 9,259,880 B2 | 2/2016 | Chen |
| 9,308,690 B2 | 4/2016 | Boyer et al. |
| 9,327,385 B2 | 5/2016 | Webb et al. |
| 9,346,217 B2 | 5/2016 | Huang et al. |
| 9,346,218 B2 | 5/2016 | Chen et al. |
| 9,360,757 B2 | 6/2016 | DeSimone et al. |
| 9,364,848 B2 | 6/2016 | Silverbrook |
| 9,403,322 B2 | 8/2016 | Das et al. |
| 9,403,324 B2 | 8/2016 | Ederer et al. |
| 9,415,443 B2 | 8/2016 | Ljungblad et al. |
| 9,415,544 B2 | 8/2016 | Kerekes et al. |
| 9,415,547 B2 | 8/2016 | Chen et al. |
| 9,429,104 B2 | 8/2016 | Fuller |
| 9,434,107 B2 | 9/2016 | Zenere |
| 9,446,557 B2 | 9/2016 | Zenere et al. |
| 9,453,142 B2 | 9/2016 | Rolland et al. |
| 9,456,884 B2 | 10/2016 | Uckelmann et al. |
| 9,457,374 B2 | 10/2016 | Hibbs et al. |
| 9,463,488 B2 | 10/2016 | Ederer et al. |
| 9,469,074 B2 | 10/2016 | Ederer et al. |
| 9,486,944 B2 | 11/2016 | El-Siblani et al. |
| 9,486,964 B2 | 11/2016 | Joyce |
| 9,487,443 B2 | 11/2016 | Watanabe |
| 9,498,920 B2 | 11/2016 | DeSimone et al. |
| 9,498,921 B2 | 11/2016 | Teulet |
| 9,511,546 B2 | 12/2016 | Chen et al. |
| 9,517,591 B2 | 12/2016 | Yoo et al. |
| 9,517,592 B2 | 12/2016 | Yoo et al. |
| 9,527,244 B2 | 12/2016 | El-Siblani |
| 9,527,272 B2 | 12/2016 | Steele |
| 9,529,371 B2 | 12/2016 | Nakamura |
| 9,533,450 B2 | 1/2017 | El-Siblani et al. |
| 9,539,762 B2 | 1/2017 | Durand et al. |
| 9,545,753 B2 | 1/2017 | Costabeber |
| 9,545,784 B2 | 1/2017 | Nakamura |
| 9,550,326 B2 | 1/2017 | Costabeber |
| 9,561,622 B2 | 2/2017 | Das et al. |
| 9,561,623 B2 | 2/2017 | El-Siblani et al. |
| 9,578,695 B2 | 2/2017 | Jerby et al. |
| 9,579,852 B2 | 2/2017 | Okamoto |
| 9,581,530 B2 | 2/2017 | Guthrie et al. |
| 9,592,635 B2 | 3/2017 | Ebert et al. |
| 9,604,411 B2 | 3/2017 | Rogren |
| 9,610,616 B2 | 4/2017 | Chen et al. |
| 9,616,620 B2 | 4/2017 | Hoechsmann et al. |
| 9,632,037 B2 | 4/2017 | Chen et al. |
| 9,632,420 B2 | 4/2017 | Allanic |
| 9,632,983 B2 | 4/2017 | Ueda et al. |
| 9,636,873 B2 | 5/2017 | Joyce |

(56) References Cited

U.S. PATENT DOCUMENTS

| | | |
|---|---|---|
| 9,649,812 B2 | 5/2017 | Hartmann et al. |
| 9,649,815 B2 | 5/2017 | Atwood et al. |
| 9,656,344 B2 | 5/2017 | Kironn et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |
| 9,688,027 B2 | 6/2017 | Batchelder et al. |
| 9,707,720 B2 | 7/2017 | Chen et al. |
| 9,720,363 B2 | 8/2017 | Chillscyzn et al. |
| 9,738,034 B2 | 8/2017 | Gruber et al. |
| 9,738,564 B2 | 8/2017 | Capobianco et al. |
| 9,751,292 B2 | 9/2017 | Jamar et al. |
| 9,764,513 B2 | 9/2017 | Stampfl et al. |
| 9,764,535 B2 | 9/2017 | Xie et al. |
| 9,821,546 B2 | 11/2017 | Schaafsma et al. |
| 9,862,146 B2 | 1/2018 | Driessen et al. |
| 9,862,150 B2 | 1/2018 | Chen et al. |
| 9,868,255 B2 | 1/2018 | Comb et al. |
| 9,885,987 B2 | 2/2018 | Chillscysn et al. |
| 9,895,843 B2 | 2/2018 | Lobovsky et al. |
| 9,901,983 B2 | 2/2018 | Hovel et al. |
| 9,908,293 B2 | 3/2018 | Yoo et al. |
| 9,919,474 B2 | 3/2018 | Napadensky |
| 9,919,515 B2 | 3/2018 | Daniell et al. |
| 9,950,368 B2 | 4/2018 | Lampenscherf et al. |
| 9,956,727 B2 | 5/2018 | Steele |
| 9,962,767 B2 | 5/2018 | Buller et al. |
| 9,981,411 B2 | 5/2018 | Green et al. |
| 10,000,023 B2 | 6/2018 | El-Siblani et al. |
| 10,011,076 B2 | 7/2018 | El-Siblani et al. |
| 10,061,302 B2 | 8/2018 | Jacobs et al. |
| 10,071,422 B2 | 9/2018 | Buller et al. |
| 10,124,532 B2 | 11/2018 | El-Siblani et al. |
| 10,150,254 B2 | 12/2018 | Bauman et al. |
| 10,155,345 B2 | 12/2018 | Ermoshkin et al. |
| 10,155,882 B2 | 12/2018 | Rolland et al. |
| 10,183,330 B2 | 1/2019 | Buller et al. |
| 10,183,444 B2 | 1/2019 | Campbell |
| 10,240,066 B2 | 3/2019 | Rolland et al. |
| 10,245,784 B2 | 4/2019 | Teken et al. |
| 10,317,882 B2 | 6/2019 | de Pena et al. |
| 10,336,055 B2 | 7/2019 | Das et al. |
| 10,336,057 B2 | 7/2019 | Moore et al. |
| 10,350,823 B2 | 7/2019 | Rolland et al. |
| 10,357,956 B2 | 7/2019 | Usami et al. |
| 10,406,748 B2 | 9/2019 | Honda |
| 10,612,112 B2 | 4/2020 | Yang et al. |
| 10,639,843 B2 | 5/2020 | Yuan et al. |
| 10,682,808 B2 | 6/2020 | Fujita et al. |
| 10,695,988 B2 | 6/2020 | Hanyu et al. |
| 10,717,212 B2 | 7/2020 | Parkinson et al. |
| 10,737,479 B2 | 8/2020 | El-Siblani et al. |
| 2002/0164069 A1 | 11/2002 | Nagano et al. |
| 2003/0180171 A1 | 9/2003 | Artz et al. |
| 2003/0209836 A1 | 11/2003 | Sherwood |
| 2005/0012239 A1 | 1/2005 | Nakashima |
| 2005/0019016 A1 | 9/2005 | Ishikawa et al. |
| 2006/0230984 A1 | 10/2006 | Bredt et al. |
| 2006/0248062 A1 | 11/2006 | Libes et al. |
| 2007/0063366 A1 | 3/2007 | Cunningham et al. |
| 2007/0116937 A1 | 5/2007 | Lazzerini |
| 2008/0170112 A1 | 7/2008 | Hull et al. |
| 2008/0224352 A1 | 9/2008 | Narukawa et al. |
| 2008/0241404 A1 | 10/2008 | Allaman et al. |
| 2010/0003619 A1 | 1/2010 | Das et al. |
| 2010/0196694 A1 | 8/2010 | Yamazaki et al. |
| 2010/0290016 A1 | 11/2010 | Kaehr et al. |
| 2011/0089610 A1 | 4/2011 | El-Siblani et al. |
| 2011/0101570 A1 | 5/2011 | John et al. |
| 2011/0162989 A1 | 7/2011 | Ducker et al. |
| 2011/0207057 A1 | 8/2011 | Hull et al. |
| 2012/0195994 A1 | 8/2012 | El-Siblani et al. |
| 2012/0292800 A1 | 11/2012 | Higuchi et al. |
| 2012/0313294 A1 | 12/2012 | Vermeer et al. |
| 2013/0008879 A1 | 1/2013 | Bichsel |
| 2013/0140741 A1 | 6/2013 | El-Siblani et al. |
| 2014/0099476 A1 | 4/2014 | Subramanian et al. |
| 2014/0103581 A1 | 4/2014 | Das et al. |
| 2014/0200865 A1 | 7/2014 | Lehmann et al. |
| 2014/0239554 A1 | 8/2014 | El-Siblani et al. |
| 2014/0275317 A1 | 9/2014 | Moussa |
| 2014/0319735 A1 | 10/2014 | El-Siblani et al. |
| 2014/0322374 A1 | 10/2014 | El-Siblani et al. |
| 2014/0332507 A1 | 11/2014 | Fockele |
| 2014/0339741 A1 | 11/2014 | Aghababaie et al. |
| 2014/0348691 A1 | 11/2014 | Ljungblad et al. |
| 2014/0348692 A1 | 11/2014 | Bessac et al. |
| 2015/0004042 A1 | 1/2015 | Nimal |
| 2015/0004046 A1 | 1/2015 | Graham et al. |
| 2015/0056365 A1 | 2/2015 | Miyoshi |
| 2015/0086409 A1 | 3/2015 | Hellestam |
| 2015/0102531 A1 | 4/2015 | El-Siblani et al. |
| 2015/0104563 A1 | 4/2015 | Lowe et al. |
| 2015/0140152 A1 | 5/2015 | Chen |
| 2015/0140155 A1 | 5/2015 | Ohno et al. |
| 2015/0145174 A1 | 5/2015 | Comb |
| 2015/0158111 A1 | 6/2015 | Schwarze et al. |
| 2015/0165695 A1 | 6/2015 | Chen et al. |
| 2015/0210013 A1 | 7/2015 | Teulet |
| 2015/0224710 A1 | 8/2015 | El-Siblani |
| 2015/0231798 A1 | 8/2015 | Goto |
| 2015/0231828 A1 | 8/2015 | El-Siblani et al. |
| 2015/0231831 A1 | 8/2015 | El-Siblani |
| 2015/0246487 A1 | 9/2015 | El-Siblani |
| 2015/0251351 A1 | 9/2015 | Feygin |
| 2015/0268099 A1 | 9/2015 | Craig et al. |
| 2015/0298396 A1 | 10/2015 | Chen et al. |
| 2015/0301517 A1 | 10/2015 | Chen et al. |
| 2015/0306819 A1 | 10/2015 | Ljungblad |
| 2015/0306825 A1 | 10/2015 | Chen et al. |
| 2015/0321421 A1 | 11/2015 | Ding |
| 2015/0352668 A1 | 12/2015 | Scott et al. |
| 2015/0352791 A1 | 12/2015 | Chen et al. |
| 2015/0355553 A1 | 12/2015 | Allanic |
| 2015/0375452 A1 | 12/2015 | Huang et al. |
| 2016/0016361 A1 | 1/2016 | Lobovsky et al. |
| 2016/0031010 A1 | 2/2016 | O'Neill et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0059484 A1 | 3/2016 | DeSimone et al. |
| 2016/0059485 A1 | 3/2016 | Ding et al. |
| 2016/0067921 A1 | 3/2016 | Willis et al. |
| 2016/0082662 A1 | 3/2016 | Majer |
| 2016/0082671 A1 | 3/2016 | Joyce |
| 2016/0096332 A1 | 4/2016 | Chen et al. |
| 2016/0107340 A1 | 4/2016 | Joyce |
| 2016/0107383 A1 | 4/2016 | Dikovsky et al. |
| 2016/0107387 A1 | 4/2016 | Ooba et al. |
| 2016/0129631 A1 | 5/2016 | Chen et al. |
| 2016/0137839 A1 | 5/2016 | Rolland et al. |
| 2016/0167160 A1 | 6/2016 | Hellestam |
| 2016/0176114 A1 | 6/2016 | Tsai et al. |
| 2016/0184931 A1 | 6/2016 | Green |
| 2016/0193785 A1 | 7/2016 | Bell et al. |
| 2016/0214327 A1 | 7/2016 | Ucklemann et al. |
| 2016/0221262 A1 | 8/2016 | Das et al. |
| 2016/0243649 A1 | 8/2016 | Zheng et al. |
| 2016/0303798 A1 | 10/2016 | Mironets et al. |
| 2016/0332386 A1 | 11/2016 | Kuijpers |
| 2016/0361871 A1 | 12/2016 | Jeng et al. |
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0021562 A1 | 1/2017 | El-Siblani et al. |
| 2017/0066185 A1 | 3/2017 | Ermoshkin et al. |
| 2017/0066196 A1 | 3/2017 | Beard et al. |
| 2017/0072635 A1 | 3/2017 | El-Siblani et al. |
| 2017/0080641 A1 | 3/2017 | El-Siblani |
| 2017/0087670 A1 | 3/2017 | Kalentics et al. |
| 2017/0100895 A1 | 4/2017 | Chou et al. |
| 2017/0100897 A1 | 4/2017 | Chou et al. |

(56) References Cited

U.S. PATENT DOCUMENTS

| | | |
|---|---|---|
| 2017/0100899 A1 | 4/2017 | El-Siblani et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0157841 A1 | 6/2017 | Green |
| 2017/0157862 A1 | 6/2017 | Bauer |
| 2017/0165916 A1 | 6/2017 | El-Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0276651 A1 | 9/2017 | Hall |
| 2017/0284971 A1 | 10/2017 | Hall |
| 2017/0291804 A1 | 10/2017 | Craft et al. |
| 2017/0297108 A1 | 10/2017 | Gibson et al. |
| 2017/0297109 A1 | 10/2017 | Gibson et al. |
| 2017/0305136 A1 | 10/2017 | Elsey |
| 2017/0326786 A1 | 11/2017 | Yuan et al. |
| 2017/0326807 A1 | 11/2017 | Greene et al. |
| 2017/0368816 A1 | 12/2017 | Batchelder et al. |
| 2018/0001567 A1 | 1/2018 | Juan et al. |
| 2018/0015672 A1 | 1/2018 | Shusteff et al. |
| 2018/0043619 A1 | 2/2018 | Kim et al. |
| 2018/0056585 A1 | 3/2018 | Du Toit |
| 2018/0056604 A1 | 3/2018 | Sands et al. |
| 2018/0079137 A1 | 3/2018 | Herzog et al. |
| 2018/0085998 A1 | 3/2018 | von Burg |
| 2018/0117790 A1 | 5/2018 | Yun |
| 2018/0169969 A1 | 6/2018 | Deleon et al. |
| 2018/0200948 A1* | 7/2018 | Kuijpers ............... B29C 64/129 |
| 2018/0201021 A1 | 7/2018 | Beaver et al. |
| 2018/0229332 A1 | 8/2018 | Tsai et al. |
| 2018/0229436 A1 | 8/2018 | Gu et al. |
| 2018/0272603 A1 | 9/2018 | MacCormack et al. |
| 2018/0272608 A1 | 9/2018 | Yun |
| 2018/0345600 A1 | 12/2018 | Holford et al. |
| 2018/0370214 A1 | 12/2018 | Comb et al. |
| 2019/0022937 A1 | 1/2019 | Stelter et al. |
| 2019/0039299 A1 | 2/2019 | Busbee et al. |
| 2019/0047211 A1 | 2/2019 | Herring et al. |
| 2019/0061230 A1 | 2/2019 | Ermoshkin et al. |
| 2019/0112499 A1 | 4/2019 | Rolland et al. |
| 2019/0126548 A1 | 5/2019 | Barnhart et al. |
| 2019/0232369 A1* | 8/2019 | Strößner ............... B29C 64/153 |
| 2019/0232550 A1 | 8/2019 | Mark et al. |
| 2019/0240932 A1 | 8/2019 | Graf |
| 2019/0263054 A1 | 8/2019 | Kotler et al. |
| 2019/0283316 A1 | 9/2019 | Rolland et al. |
| 2019/0344381 A1 | 11/2019 | Pomerantz et al. |
| 2019/0389137 A1 | 12/2019 | Frohnmaier et al. |
| 2020/0001398 A1 | 1/2020 | Mellor et al. |
| 2020/0079008 A1 | 3/2020 | Chowdry et al. |
| 2020/0079017 A1 | 3/2020 | MacNeish, III et al. |
| 2020/0108553 A1 | 4/2020 | Rogren |
| 2020/0164437 A1 | 5/2020 | Goth et al. |
| 2020/0198224 A1 | 6/2020 | Dubelman et al. |
| 2020/0230938 A1 | 7/2020 | Menchik et al. |
| 2020/0247040 A1 | 8/2020 | Green |
| 2020/0290275 A1 | 9/2020 | Dubelman et al. |
| 2020/0307075 A1 | 10/2020 | Mattes et al. |
| 2020/0376775 A1 | 12/2020 | Das et al. |
| 2021/0046695 A1 | 2/2021 | Thompson et al. |

FOREIGN PATENT DOCUMENTS

| | | |
|---|---|---|
| CN | 103522546 A | 1/2014 |
| CN | 104175559 A | 12/2014 |
| CN | 104647752 A | 5/2015 |
| CN | 105711101 A | 6/2016 |
| CN | 105773962 A | 7/2016 |
| CN | 107322930 A | 11/2017 |
| CN | 208946717 U | 6/2019 |
| CN | 109968661 A | 7/2019 |
| CN | 111497231 A | 8/2020 |
| DE | 102007010624 A1 | 9/2008 |
| EP | 448459 A1 | 9/1991 |
| EP | 557051 A1 | 8/1993 |
| EP | 1454831 B1 | 9/2004 |
| EP | 1852244 A2 | 11/2007 |
| EP | 1864785 A1 | 12/2007 |
| EP | 1946908 A2 | 7/2008 |
| EP | 2521524 A1 | 11/2012 |
| EP | 3053729 A1 | 8/2016 |
| EP | 3453521 A1 | 3/2019 |
| EP | 3356121 B1 | 10/2020 |
| GB | 2311960 A | 10/1997 |
| JP | H06246839 A | 9/1994 |
| JP | 2002370286 A | 12/2002 |
| JP | 2003039564 A | 2/2003 |
| JP | 2004/257929 A | 9/2004 |
| JP | 2016196098 A | 11/2016 |
| KR | 20170108729 A | 9/2017 |
| KR | 102109664 B1 | 5/2020 |
| WO | WO9600422 A1 | 1/1996 |
| WO | WO9806560 | 2/1998 |
| WO | WO0100390 A1 | 1/2001 |
| WO | WO2006/077665 A1 | 7/2006 |
| WO | WO2006109355 A1 | 10/2006 |
| WO | WO2017009368 A1 | 1/2017 |
| WO | WO2017098968 A1 | 6/2017 |
| WO | WO2017100538 A1 | 6/2017 |
| WO | WO2019/159936 A1 | 8/2019 |
| WO | WO2020033607 A1 | 2/2020 |
| WO | WO2020185553 A1 | 9/2020 |

OTHER PUBLICATIONS

Carbon, Carbon SpeedCell: Additive Manufacturing Reinvented, Redwood City California, Mar. 16, 2017, 4 Pages. Retrieved from Webpage: https://www.carbon3d.com/news/carbon-speedcell-additive-manufacturing-reinvented/.

Carbon, The 3D Printer for Products that Outperform, 8 Pages. Retrieved from Webpage: https://www.carbon3d.com.

DDM Systems, Disruptive Technologies for Additive Manufacturing, 2014. Retrieved on Jul. 7, 2020 from Web Link: http://www.ddmsvs.com/.

Designing Buildings Wiki, Types of Brick Bonding, 6 Pages. Retrieved Mar. 25, 2021 from Webpage: https://www.designbuildings.co.uk/wiki/Types_of_brick_bonding.

Doctor Blade with Micrometer Screw Gauge, The Tape Casting Warehouse, Inc., Morrisville PA, 6 Pages. Retrieved Mar. 23, 2021 from Webpage: https://www.drblade.com/.

EnvisionTEC, Advanced DLP for Superior 3D Printing, Mar. 9, 2017, 8 Pages. https://envisiontec.com/wp-content/uploads/2016/12/Why-EnvisionTEC-DLP-3D-Printing-is-Better-rebranded.pdf.

Feng et al., Exposure Reciprocity Law in Photopolymerization of Multi-Functional Acrylates and Methacrylates, Macromolecular Chemistry and Physics, vol. 208, 2007, pp. 295-306.

Formlabs, An Introduction to Post-Curing SLA 3D Prints, 8 Pages. Retrieved from Webpage: https://formlabs.com/blog/introduction-post-curing-sla-3d-prints.

Formlabs, Form Wash & Form Cure, 8 Pages. Retrieved from Webpage: https://formlabs.com/tools/wash-cure/.

Hafkamp et al., A Feasibility Study on Process Monitoring and Control in Vat Photopolymerization of Ceramics, Mechatronics, vol. 56, the Netherlands, Dec. 2018, pp. 220-241. Retrieved from https://doi.org/10.1016/j.mechatronics.2018.02.006.

(56) References Cited

OTHER PUBLICATIONS

Kudo3D, Post-Process Your SLA Prints in 4 Easy Steps, 8 Pages. Retrieved from Webpage: https://www.kudo3d.com/post-process-your-sla-prints-in-4-easy-steps/.
Leap, Low-Frequency Sonic Mixing Technology, Energy Efficiency & Renewable Energy, Energy.Gov, 5 Pages. Retrieved Mar. 17, 2021 from Webpage: https://www.energy.gov/eere/amo/low-frequency-sonic-mixing-technology.
Lee et al., Development of a 3D Printer Using Scanning Projection Stereolithography, Scientific Reports, vol. 5, Article No. 9875, 2015, 5 pages. https://www.nature.com/articles/srep09875#sl.
Lee et al., Large-Area Compatible Laser Sintering Schemes with a Spatially Extended Focused Beam, Journal, Micromachines, vol. 8, No. 153, Seoul University, Seoul Korea, May 11, 2017, 8 Pages. http://dx.doi.org/10.3390/mi8050153.
Limaye, Multi-Objective Process Planning Method for Mask Projection Stereolithography, Dissertation Georgia Institute of Technology, Dec. 2007, 324 Pages.
Lithoz, 2 Pages. Retrieved from Webpage: http://www.lithoz.com/en/our-products/cleaning-station.
Matthews et al., Diode-Based Additive Manufacturing of Metals Using an Optically-Addressable Light Valve, Optic Express Research Article, vol. 25, No. 10, Lawrence Livermore National Laboratory, Livermore CA, May 10, 2017.
Nussbaum et al., Evaluation of Processing Variables in Large Area Polymer Sintering of Single Layer Components, Solid Freeform Fabrication 2016: Proceedings of the $27^{th}$ Annual International Solid Freeform Fabracation Symposium—An Additive Manufacturing Conference Reviewed Paper, University of South Florida, Tampa Florida.
Park et al., Development of Multi-Material DLP 3D Printer, Journal of the Korean Society of Manufacturing Technology Engineers, vol. 26, Issue 1, Seoul Korea, Feb. 15, 2017, pp. 100-107. https://doi.org/10.7735/ksmte.2017.26.1.100.
Prodways Tech, Prodways Movinglight Technology Retrieved on Jul. 2, 2020 from Web Link: https://www.prodways.com/en/the-prodways-movinglight-technology/.
Ricoh Imaging Company Ltd., The Advanced Pixel Shift Resolution System II for Super-High-Resolution Images, Pentax K-1 Mark II, Pixel Shift Resolution System, 4 Pages. Retrieved on Mar. 30, 2021 from Webpage: http://www.ricoh-imaging.co.jp/english/products/k-1-2/feature/02.html.
Sonics & Materials, Inc., Ultrasonic Food Cutting Equipment, Sonics & Materials, Inc., Retrieved on Jun. 26, 2020, 4 Pages. https://www.sonics.com/food-cutting.
Stemmer Imaging, Ultra-High Resolution for Industrial Imaging, Germany, 9 Pages. Retrieved on Mar. 30, 2021 from Webpage: https://www.stemmer-imaging.com/en/knowledge-base/pixel-shift-technology/.
Stevenson, Admatec's Ceramic 3D Printers, Ceramic, Metal, Fabbaloo 3D Printing News, Jan. 21, 2019, 8 Pages. Retrieved Nov. 24, 2020 from Weblink: https://www.fabbloo.com/blog/2019/1/21/adamtecs-cermaic-3d-printers.
TechMetals, Electroless Nickel (TM 117C), Engineered Metal Finishing & Performance Coatings, 1 Page. Retrieved from Webpage: https://techmetals.com/pdfs/TM_117C.pdf https://techmetals.com/tm117c-2/.
Telsonic Ultrasonics, Cutting Awning Fabrics and Sealing the Edge, the Powerhouse of Ultrasonics, 2017, 1 Page. https://www.telsonic.com/fileadmin/applications/AS_206_Cut_Seal_Markisengewebe_EN.pdf.
Telsonic Ultrasonics, Integrated Power Actuator—IPA 3505, Telsonic Ultrasonics, Retrieved Jun. 26, 2020, 2 Pages. https://www.telsonic.com/en/products/integrated-power-actuator-ipa-3505/.
Tok et al., Tape Casting of High Dielectric Ceramic Substrates for Microelectronics Packaging, Journal of Materials Engineering and Performance, vol. 8, 1999, pp. 469-472. (Abstract Only) https://link.springer.com/article/10.1361/105994999770346783.
Wikipedia, Pixel Shifting, 2 Pages. Retrieved Mar. 30, 2021 from Webpage: https://en.wikipedia.org/wiki/Pixel_shifting.
Wikipedia, Standing Wave, 11 Pages. Retrieved Mar. 17, 2021 from Webpage: https://en.wikipedia.org/wiki/Standing_wave.

* cited by examiner

RECLAMATION SYSTEM FOR ADDITIVE MANUFACTURING

CROSS-REFERENCE TO RELATED APPLICATION

The present application claims priority to U.S. Provisional Patent Application Ser. No. 63/214,294, filed on Jun. 24, 2021, the contents of which of which are hereby incorporated by reference in their entirety.

FIELD

The present subject matter relates generally to an additive manufacturing apparatus, and more particularly to a reclamation system for the additive manufacturing apparatus.

BACKGROUND

Additive manufacturing is a process in which material is built up layer-by-layer to form a component. Stereolithography (SLA) is a type of additive manufacturing process, which employs a tank of radiant-energy curable photopolymer "resin" and a curing energy source such as a laser. Similarly, Digital Light Processing (DLP) three-dimensional (3D) printing employs a two-dimensional image projector to build components one layer at a time. For each layer, the energy source draws or flashes a radiation image of the cross section of the component onto the surface of the resin. Exposure to the radiation cures and solidifies the pattern in the resin and joins it to a previously-cured layer.

In some instances, additive manufacturing may be accomplished through a "tape casting" process. In this process, a resin is deposited onto a flexible radiotransparent tape or foil, that is fed out from a feed reel to a build zone. Radiant energy is produced from a radiant energy device and directed through a window to cure the resin to a component that is supported by a stage in the build zone. Once the curing of the first layer is complete, the stage and the foil are separated from one another. The foil is then advanced and fresh resin is provided to the build zone. In turn, the first layer of the cured resin is placed onto the fresh resin and cured through the energy device to form an additional layer of the component. Subsequent layers are added to each previous layer until the component is completed.

In operation, as each layer of the component is formed, various amounts of resin may be unused and retained on the foil. Accordingly, it may be beneficial for the additive manufacturing apparatus to include a system that reclaims at least a portion of the unused resin.

BRIEF DESCRIPTION

Aspects and advantages of the invention will be set forth in part in the following description, or may be obvious from the description, or may be learned through practice of the invention.

In some embodiments of the present disclosure, a reclamation system for an additive manufacturing apparatus is provided. The reclamation system includes a collection structure configured to remove at least a portion of the resin from a foil. A containment vessel is configured to retain the resin removed from the foil. A drain directs the resin from the containment vessel to a reservoir.

In some embodiments of the present disclosure, a method operating an additive manufacturing apparatus. The method includes depositing a resin onto a foil and translating the foil within a build zone. The method also includes curing a first portion of the resin to create a layer of a component. The method further includes translating the foil along a scraper. Lastly, the method includes removing a second portion of the resin from the foil by a vibrating head of the scraper.

In some embodiments of the present disclosure, an additive manufacturing apparatus includes a stage configured to hold one or more cured layers of resin that form a component. A radiant energy device is operable to generate and project radiant energy in a patterned image. An actuator is configured to change a relative position of the stage relative to the radiant energy device. A reclamation system is downstream of the stage and is configured to remove at least a portion of the resin from a foil. The reclamation system is configured to redirect the foil from a first translational direction to a second translational direction through contact with a collection structure.

These and other features, aspects, and advantages of the present disclosure will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
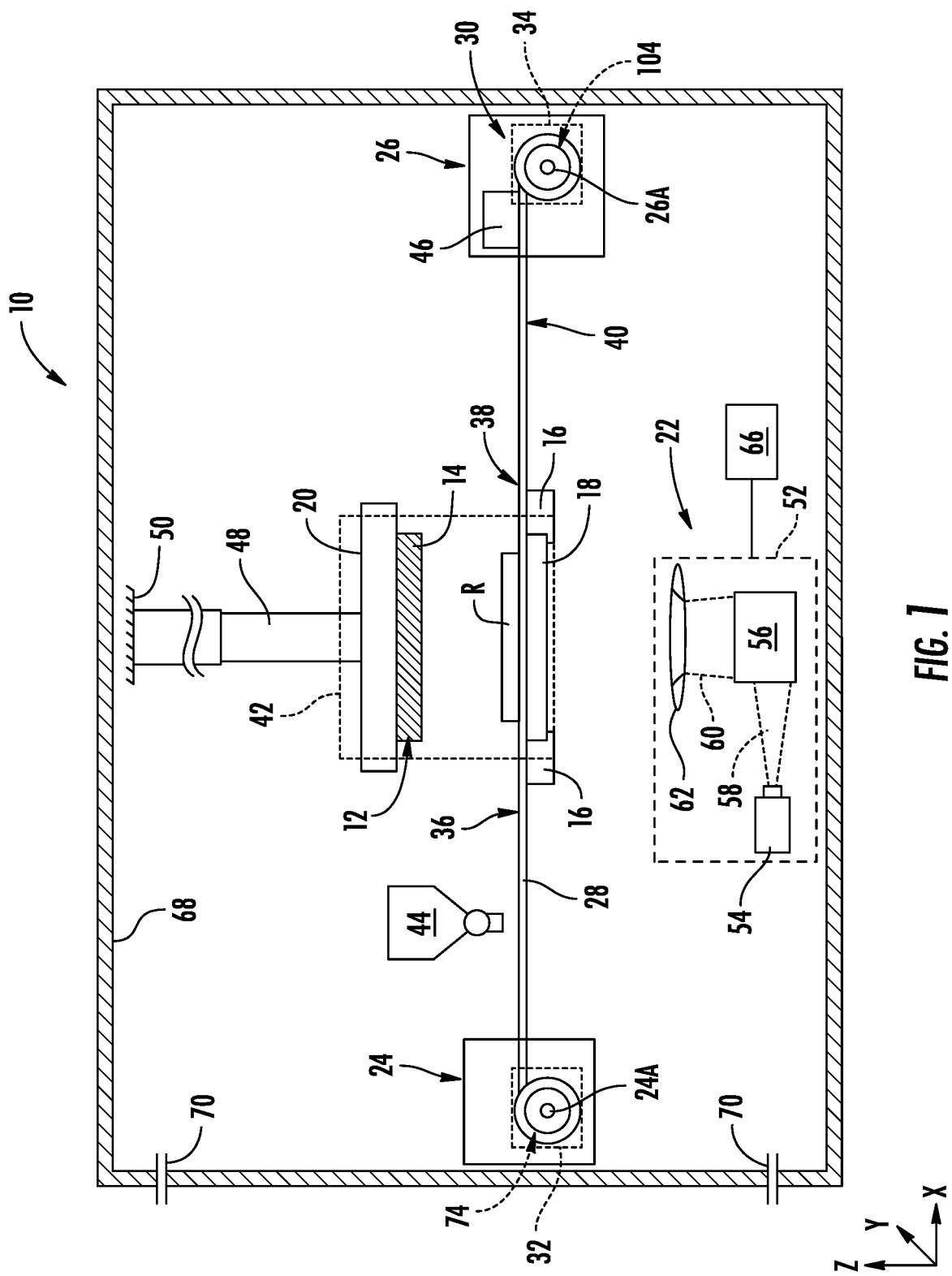
FIG. 1 is a schematic side view of an additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a foil (or resin support) movement along the manufacturing apparatus. For example, "upstream" refers to the direction from which the foil moves, and "downstream" refers to the direction to which the foil moves. The term "selectively" refers to a component's ability to operate in various states (e.g., an ON state and an OFF state) based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to an additive manufacturing apparatus that implements various manufacturing processes such that successive layers of material(s) (e.g., resins) are provided on each other to "build-up," layer-by-layer, a three-dimensional component. The successive layers generally cure together to form a monolithic component which may have a variety of integral sub-components. Although additive manufacturing technology is described herein as enabling the fabrication of complex objects by building objects point-by-point, layer-by-layer, variations of the described additive manufacturing apparatus and technology are possible and within the scope of the present subject matter.

The additive manufacturing apparatus can include a support plate, a window supported by the support plate, and a stage moveable relative to the window. The additive manufacturing apparatus further includes a flexible tape or foil that supports a resin. The foil, with the resin thereon, is positioned between the stage and the support plate. A radiant energy device is configured to cure a portion of the resin forming the component, which is translated towards and away from the foil by the stage between successive curing operations.

In operation, as each layer of the component is formed, various amounts of resin may be unused and retained on the foil after exiting a build zone of the apparatus. In some instances, a reclamation system may be used to reclaim at least a portion of the unused resin. For example, the reclamation system may be used to remove a portion of the resin downstream of the stage.

In various examples, the reclamation system may include a collection structure that is configured to contact the foil and direct the resin to a containment vessel. Further, the collection structure may include a scraper that is configured to contact the foil and, possibly, alter a direction of the foil. The scraper may be integrally formed with the collection structure and/or be formed from various components that are attached to the collection structure. For instance, the scraper may include or form a head that is operably coupled with the collection structure. In various cases, the head may be stationary and/or move. In cases in which the head moves, mechanical actuation and/or ultrasonic energy may be implemented to aid in the removal of the resin from the foil while providing lower, additional normal forces to the foil. The additional ultrasonic energy may amplify the forces parallel to the foil to help release the slurry without applying additional strain on the foil. The lower amounts of force on the foil may prevent and minimize breakage of the foil.

The resin, once removed by the scraper, may be directed into the containment vessel. The containment vessel may define a drain that directs the resin from the containment vessel to the reservoir. From the reservoir, the resin may be refreshed for reuse and/or recertification and returned to a material depositor. Additionally or alternatively, the resin retained within the reservoir may be removed from the apparatus as waste.

Referring to the drawings wherein identical reference numerals denote the similar elements throughout the various views, FIG. 1 schematically illustrates an example of one type of suitable apparatus 10 for forming a component 12 created through one or more cured layers 14 of cured resin R. The apparatus 10 can include one or more of a support plate 16, a window 18, a stage 20 that is movable relative to the window 18, and a radiant energy device 22, which, in combination, may be used to form any number (e.g., one or more) of additively manufactured components 12.

In the illustrated example, the apparatus 10 includes a feed module 24, which may include a first mandrel 24A, and a take-up module 26, which may include a second mandrel 26A, that are spaced-apart and configured to couple with respective end portions of a flexible tape or foil 28 or another type of resin support extending therebetween. A portion of the foil 28 can be supported from underneath by the support plate 16. Suitable mechanical supports (frames, brackets, etc.) may be provided for the mandrels 24A, 26A and the support plate 16. The first mandrel 24A and/or the second mandrel 26A can be configured to control the speed and direction of the foil 28 such that the desired tension and speed is maintained in the foil 28 through a drive system 30. By way of example and not limitation, the drive system 30 can be configured as one or more control devices 32, 34 associated with the first mandrel 24A and/or the second mandrel 26A. Moreover, the drive system 30 may include various components, such as motors, actuators, feedback sensors, and/or controls that can be provided for driving the mandrels 24A, 26A in such a manner so as to move at least a portion of the foil 28 between the mandrels 24A, 26A.

In various embodiments, the window 18 is transparent and can be operably supported by the support plate 16. Further, the window 18 and the support plate 16 can be integrally formed such that one or more windows 18 are integrated within the support plate 16. Likewise, the foil 28 is also transparent or includes portions that are transparent. As used herein, the terms "transparent" and "radiotransparent" refer to a material that allows at least a portion of radiant energy of a selected wavelength to pass through. For example, the radiant energy that passes through the window 18 and the foil 28 can be in the ultraviolet spectrum, the infrared spectrum, the visible spectrum, or any other practicable radiant energy. Non-limiting examples of transparent materials include polymers, glass, and crystalline minerals, such as sapphire or quartz.

The foil 28 extends between the feed module 24 and the take-up module 26 and defines a "resin surface" 36, which is shown as being planar, but could alternatively be arcuate (depending on the shape of the support plate 16). In some instances, the resin surface 36 may be defined by a first side 38 of the foil 28 and be positioned to face the stage 20 with the window 18 on an opposing side of the foil 28 from the stage 20. A second side 40 of the foil 28 may be defined as a side that the foil 28 that is opposite the resin R. For purposes of convenient description, the resin surface 36 may be considered to be oriented parallel to an X-Y plane of the apparatus 10, and a direction perpendicular to the X-Y plane is denoted as a Z-axis direction (X, Y, and Z being three mutually perpendicular directions). As used herein, the X-axis refers to the machine direction along the length of the foil 28. As used herein, the Y-axis refers to the transverse direction across the width of the foil 28 and generally perpendicular to the machine direction. As used herein, the Z-axis refers to the stage direction that can be defined as the direction of movement of the stage 20 relative to the window 18.

The resin surface 36 may be configured to be "non-stick," that is, resistant to adhesion of a cured resin R. The non-stick properties may be embodied by a combination of variables such as the chemistry of the foil 28, its surface finish, and/or applied coatings. For instance, a permanent or semi-permanent non-stick coating may be applied. One non-limiting example of a suitable coating is polytetrafluoroethylene ("PTFE"). In some examples, all or a portion of the resin surface 36 may incorporate a controlled roughness or surface texture (e.g. protrusions, dimples, grooves, ridges, etc.) with nonstick properties. Additionally or alternatively, the foil 28 may be made in whole or in part from an oxygen-permeable material.

For reference purposes, an area or volume immediately surrounding the location of the foil 28 and the window 18 or transparent portion defined by the support plate 16 may be defined as a "build zone," labeled 42.

In some instances, a material depositor 44 may be positioned along the foil 28. The material depositor 44 may be any device or combination of devices that is operable to apply a layer of the resin R on the foil 28. The material depositor 44 may optionally include a device or combination of devices to define a height of the resin R on the foil 28 and/or to level the resin R on the foil 28. Nonlimiting examples of suitable material deposition devices include chutes, hoppers, pumps, spray nozzles, spray bars, or printheads (e.g. inkjets). In some examples, a doctor blade may be used to control the thickness of resin R applied to the foil 28, as the foil 28 passes the material depositor 44.

In some embodiments, a reclamation system 46 may be configured to remove at least a portion of resin R that remains on the foil 28 after the foil 28 is removed from a build zone 42. For example, the reclamation system 46 may include a wiper assembly, a blade assembly, and/or any other removal assembly and a reservoir for collecting the resin R that is removed from the foil 28.

The resin R includes any radiant-energy curable material, which is capable of adhering or binding together the filler (if used) in the cured state. As used herein, the term "radiant-energy curable" refers to any material which solidifies or partially solidifies in response to the application of radiant energy of a particular frequency and energy level. For example, the resin R may include a photopolymer resin containing photo-initiator compounds functioning to trigger a polymerization reaction, causing the resin R to change from a liquid (or powdered) state to a solid state. Alternatively, the resin R may include a material that contains a solvent that may be evaporated out by the application of radiant energy. The resin R may be provided in solid (e.g. granular) or liquid form, including a paste or slurry.

Furthermore, the resin R can have a relatively high viscosity fluid that will not "slump" or run off during the build process. The composition of the resin R may be selected as desired to suit a particular application. Mixtures of different compositions may be used. The resin R may be selected to have the ability to out-gas or burn off during further processing, such as a sintering process.

The resin R may incorporate a filler. The filler may be pre-mixed with the resin R, then loaded into the material depositor 44. The filler includes particles, which are conventionally defined as "a small bit of matter." The filler may include any material that is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In some examples, the filler composition may be selected for its electrical or electromagnetic properties, e.g. it may specifically be an electrical insulator, a dielectric material, an electrical conductor, and/or magnetic.

The filler may be "fusible," meaning it is capable of consolidation into a mass upon via application of sufficient energy. For example, fusibility is a characteristic of many available powders including, but not limited to, polymeric, ceramic, glass, and/or metallic materials. The proportion of filler to resin R may be selected to suit a particular application. Generally, any amount of filler may be used so long as the combined material is capable of flowing and being leveled, and there is sufficient resin R to hold together the particles of the filler in the cured state.

With further reference to FIG. 1, the stage 20 is capable of being oriented parallel to the resin surface 36 or the X-Y plane. Various devices may be provided for moving the stage 20 relative to the window 18 parallel to the Z-axis direction. For example, as illustrated in FIG. 1, the movement may be provided through an actuator 48 connected between the stage 20 and a static support 50 and configured to change a relative position of the stage 20 relative to the radiant energy device 22, the support plate 16, the window 18, and/or any other static component of the apparatus 10. The actuator 48 may be configured as a ballscrew electric actuator, linear electric actuator, pneumatic cylinder, hydraulic cylinder, delta drive, or any other practicable device may additionally or alternatively be used for this purpose. In addition to, or as an alternative to, making the stage 20 movable, the foil 28 could be movable parallel to the Z-axis direction.

The radiant energy device 22 may be configured as any device or combination of devices operable to generate and project radiant energy on the resin R in a suitable pattern and with a suitable energy level and other operating characteristics to cure the resin R during the build process. For example, as shown in FIG. 1, the radiant energy device 22 may include a projector 52, which may generally refer to any device operable to generate a radiant energy patterned image of suitable energy level and other operating characteristics to cure the resin R. As used herein, the term "patterned image" refers to a projection of radiant energy comprising an array of one or more individual pixels. Non-limiting examples of patterned imaged devices include a DLP projector or another digital micromirror device, a two-dimensional array of LEDs, a two-dimensional array of lasers, and/or optically addressed light valves. In the illustrated example, the projector 52 includes a radiant energy source 54 such as a UV lamp, an image forming apparatus 56 operable to receive a source beam 58 from the radiant energy source 54 and generate a patterned image 60 to be projected onto the surface of the resin R, and optionally focusing optics 62, such as one or more lenses.

The image forming apparatus 56 may include one or more mirrors, prisms, and/or lenses and is provided with suitable actuators, and arranged so that the source beam 58 from the radiant energy source 54 can be transformed into a pixelated image in an X-Y plane coincident with the surface of the resin R. In the illustrated example, the image forming apparatus 56 may be a digital micro-mirror device.

The projector 52 may incorporate additional components, such as actuators, mirrors, etc. configured to selectively move the image forming apparatus 56 or other part of the projector 52 with the effect of rastering or shifting the location of the patterned image on the resin surface 36. Stated another way, the patterned image may be moved away from a nominal or starting location.

In addition to other types of radiant energy devices 22, the radiant energy device 22 may include a "scanned beam apparatus" used herein to refer generally to any device operable to generate a radiant energy beam of suitable energy level and other operating characteristics to cure the resin R and to scan the beam over the surface of the resin R in a desired pattern. For example, the scanned beam apparatus can include a radiant energy source 54 and a beam steering apparatus. The radiant energy source 54 may include any device operable to generate a beam of suitable power and other operating characteristics to cure the resin R. Non-limiting examples of suitable radiant energy sources 54 include lasers or electron beam guns.

The apparatus 10 may be operably coupled with a computing system 66. The computing system 66 in FIG. 1 is a generalized representation of the hardware and software that may be implemented to control the operation of the apparatus 10, including some or all of the stage 20, the radiant energy device 22, the actuator 48, and the various parts of the apparatus 10 described herein. The computing system 66 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, and for feedback control. Numerous aspects of the apparatus 10 may be subject to closed-loop control.

Optionally, the components of the apparatus 10 may be surrounded by a housing 68, which may be used to provide a shielding or inert gas (e.g., a "process gas") atmosphere using gas ports 70. Optionally, pressure within the housing 68 could be maintained at a desired level greater than or less than atmospheric. Optionally, the housing 68 could be temperature and/or humidity controlled. Optionally, ventilation of the housing 68 could be controlled based on factors such as a time interval, temperature, humidity, and/or chemical species concentration. In some embodiments, the housing 68 can be maintained at a pressure that is different than an atmospheric pressure.

Figure 2:
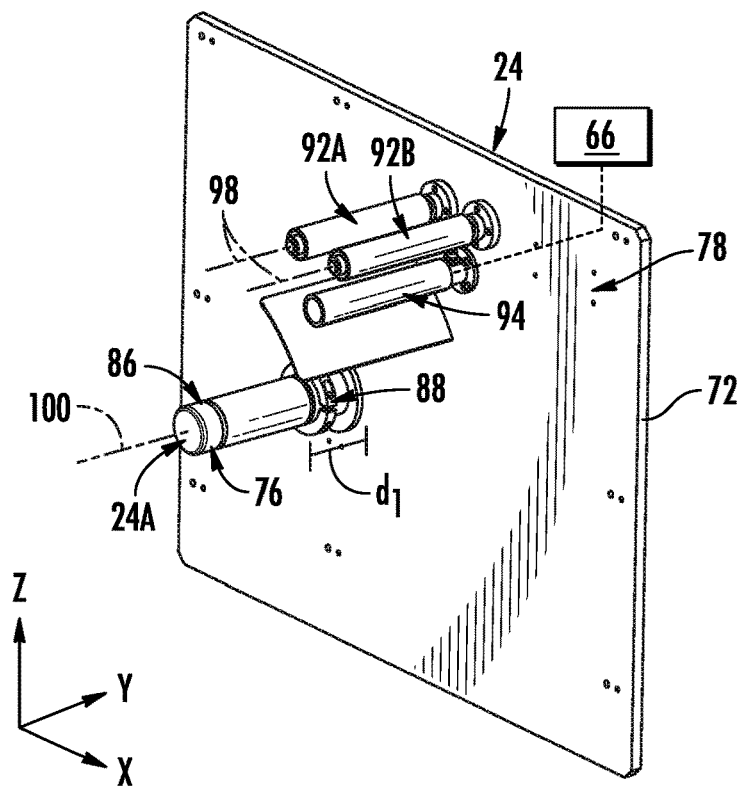
FIG. 2 is a front perspective view of a first panel configured to support one or more components of a feed module in accordance with various aspects of the present disclosure.
Figure 3:
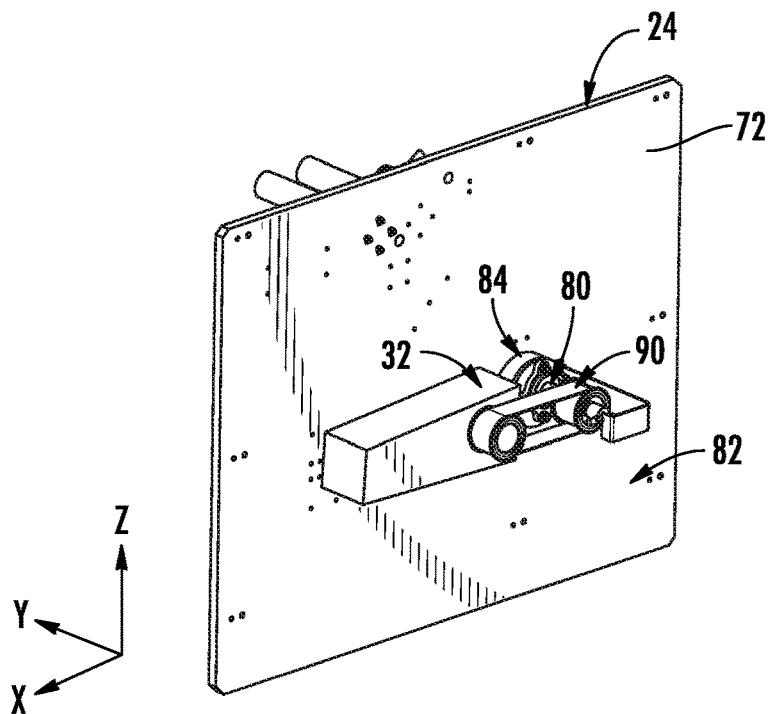
FIG. 3 is a rear perspective view of the first panel of the feed module in accordance with various aspects of the present disclosure.

Referring to FIGS. 2 and 3, exemplary perspective views of the feed module 24 including a first panel 72 are illustrated in accordance with exemplary embodiments of the present disclosure. As illustrated, the first mandrel 24A can be anchored to the first panel 72 and may support and rotate a first portion 74 (FIG. 1) of the foil 28 (FIG. 1). In various embodiments, the first mandrel 24A includes a front portion 76 on a first side 78 of the first panel 72 and a rear portion 80 on a second, opposing side 82 of the first panel 72. In some instances, a bearing 84 may be positioned along the front portion 76, the rear portion 80, and/or between the front and rear portions 76, 80.

The front portion 76 of the first mandrel 24A may include a cylindrical portion 86 that is configured to accept the first portion 74 of the foil 28 thereabout. In various instances, the foil 28 may be operably coupled to a first spool (e.g., cardboard spool, polymeric spool, paper-based spool, metallic spool, composite spool, elastomeric spool, etc.), and the first spool may be positioned about the first mandrel 24A.

A stop 88 may be positioned between the cylindrical portion 86 and the first panel 72. As such, when the foil 28 is wrapped about the first mandrel 24A, the stop 88 defines a first distance $d_1$ between an inner edge of the foil 28 and the first panel 72. In some examples, the first mandrel 24A may be configured to move between a disengaged position and an engaged position. In operation, the first mandrel 24A may be placed in the disengaged position to allow the first spool, and the foil 28 wound thereabout, to be slid along the first mandrel 24A to a position in which an end portion of the first spool is in contact or close proximity to the stop 88. Once the first spool is positioned about the first mandrel 24A, the first mandrel 24A may be placed in the engaged position causing the first spool, and, consequently, the first portion 74 of the foil 28 to rotate with the first mandrel 24A.

In some embodiments, the drive system 30 (FIG. 1) may include a first control device 32 operably coupled with the rear portion 80 of the first mandrel 24A and extends from the first panel 72. The first control device 32 may be configured as one or more motors, actuators, or any other device that may rotate the first mandrel 24A. Further, as illustrated in FIG. 4, the first control device 32 may include a transmission 90 in the form of a belt system, a gear system, and/or any other practicable system.

With further reference to FIGS. 2 and 3, one or more rollers 92A, 92B and/or a load cell 94 may be anchored to the first side 78 of the first panel 72. For example, a pair of rollers 92A, 92B may be positioned above the first mandrel 24A in the Z-axis direction. In some instances, the pair of rollers 92A, 92B may have an axis of rotation 98 that is generally parallel to an axis of rotation 100 of the first mandrel 24A.

The load cell 94 may be positioned between the pair of rollers 92A, 92B and the first mandrel 24A in the Z-axis direction. The load cell 94 may be configured as a force transducer that converts a tension or torque provided by the foil 28 onto the load cell 94 into an electrical signal that can be measured by the computing system 66 to determine a tension of the foil 28. In some embodiments, the foil 28 may be provided from the first mandrel 24A around the first roller 92A, the load cell 94, and, subsequently, the second roller 92B.

Figure 4:
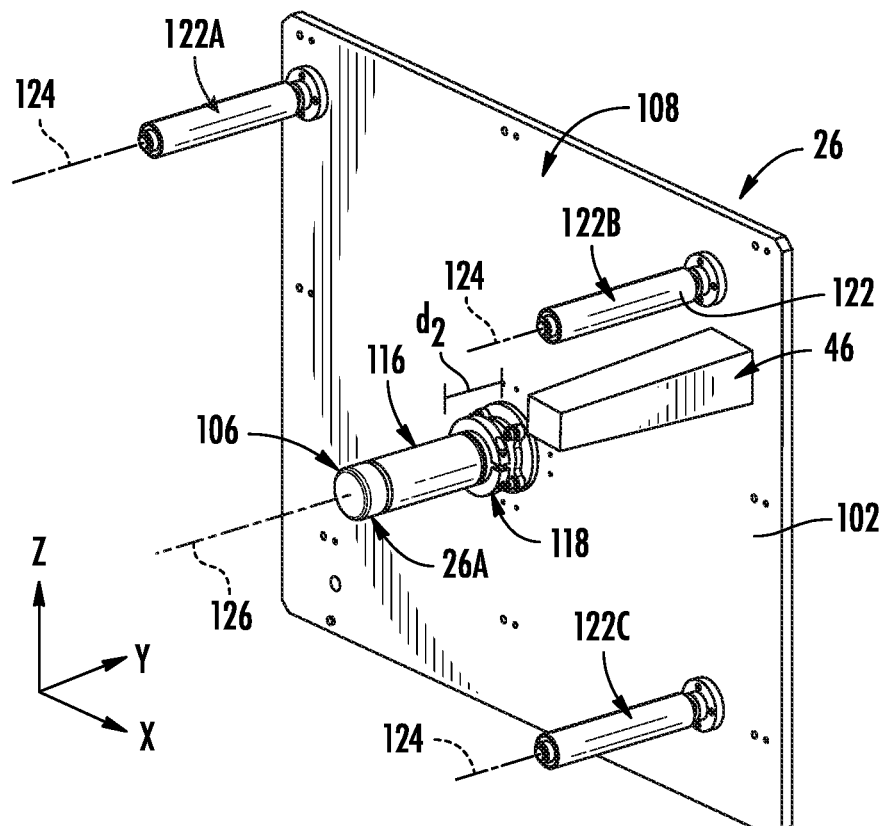
FIG. 4 is a front perspective view of a second panel configured to support one or more components of a take-up module in accordance with various aspects of the present disclosure.
Figure 5:
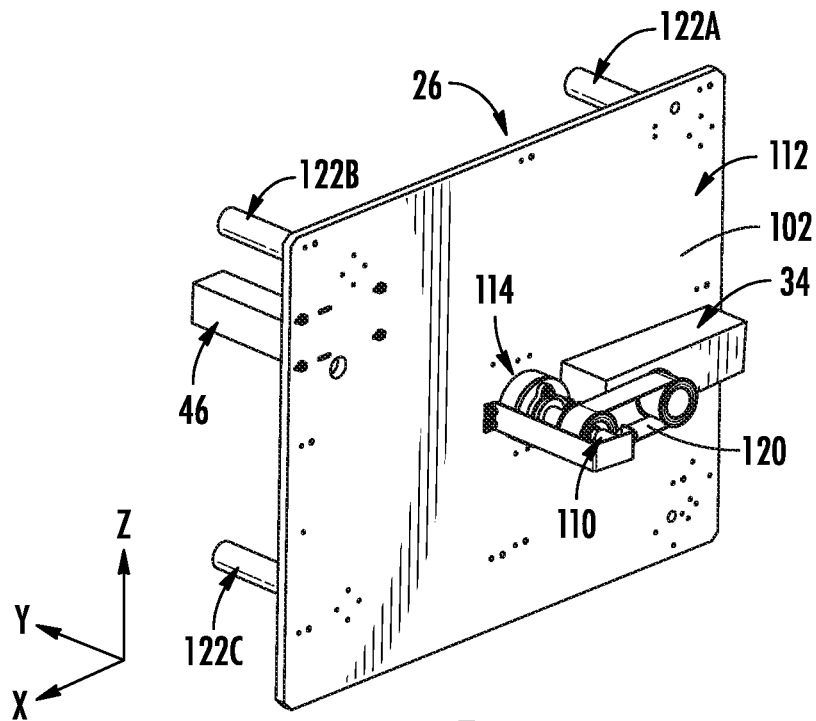
FIG. 5 is a rear perspective view of the second panel of the take-up module in accordance with various aspects of the present disclosure.

Referring to FIGS. 4 and 5, respective front and rear perspective views of the take-up module 26 including a second panel 102 are illustrated in accordance with exemplary embodiments of the present disclosure. As illustrated, the second mandrel 26A may be anchored to the second panel 102 and configured to support a second portion 104 (FIG. 1) of the foil 28 (FIG. 1). In various embodiments, the second mandrel 26A includes a front portion 106 on a first side 108 of the second panel 102 and a rear portion 110 on a second, opposing side 112 of the second panel 102. In some instances, a bearing 114 may be positioned along the front portion 106, the rear portion 110, and/or between the first and second portions 106, 110 of the second mandrel 26A.

The front portion 106 of the second mandrel 26A may include a cylindrical portion 116 that is configured to accept the second portion 104 of the foil 28 thereabout. In various instances, the foil 28 may be operably coupled to a second spool (e.g., cardboard spool, polymeric spool, paper-based spool, metallic spool, composite spool, elastomeric spool, etc.). The second spool may be positioned about the second mandrel 24A.

A stop 118 may be positioned between the cylindrical portion 116 and the second panel 102. As such, the foil 28 is wrapped about the second mandrel 26A, the stop 118 defines a second distance $d_2$ between the inner edge of the foil 28 and the second panel 102. In some examples, the second mandrel 26A may be configured to move between a disengaged position and an engaged position. In operation, the second mandrel 26A may be placed in the disengaged position to allow the second spool to be slid along the second mandrel 26A to a position in which an end portion of the second spool is in contact or close proximity to the stop 118. Once the second spool is positioned about the second mandrel 26A, the second mandrel 26A may be placed in the engaged position causing the second spool, and, consequently, the second portion 104 of the foil 28 to rotate with the second mandrel 26A.

Similar to the feed module 24, a second control device 34 may be operably coupled with the rear portion 110 of the second mandrel 26A and extends from the second panel 102. The second control device 34 may be configured as one or more motors, actuators, or any other device that may rotate the second mandrel 26A. Further, as illustrated in FIG. 5, the second control device 34 may include a transmission 120 in the form of a belt system, a gear system, and/or any other practicable system. Moreover, the first control device 32 and the second control device 34 may be operably coupled with feedback sensors and/or controls that can be provided for driving the mandrels 24A, 26A in such a manner so as to maintain the foil 28 tensioned between the mandrels 24A, 26A and to wind the foil 28 from the first mandrel 24A to the second mandrel 26A.

With further reference to FIGS. 4 and 5, one or more rollers 122 may be anchored to the first side 108 of the second panel 102. For example, a set of three rollers 122A, 122B, 122C may be positioned on various portions of the second panel 102. In some instances, each roller 122A, 122B, 122C may have an axis of rotation 124 that is generally parallel to an axis of rotation 126 of the second mandrel 26A.

The second panel 102 may further support the resin reclamation system 46, which may be configured to remove at least a portion of resin R that remains on the foil 28 after the foil 28 is removed from a build zone 42 (FIG. 1). For example, the reclamation system 46 may include a wiper assembly, a blade assembly, and/or any other removal assembly and a reservoir 158 for collecting the resin R that is removed from the foil 28.

Figure 6:
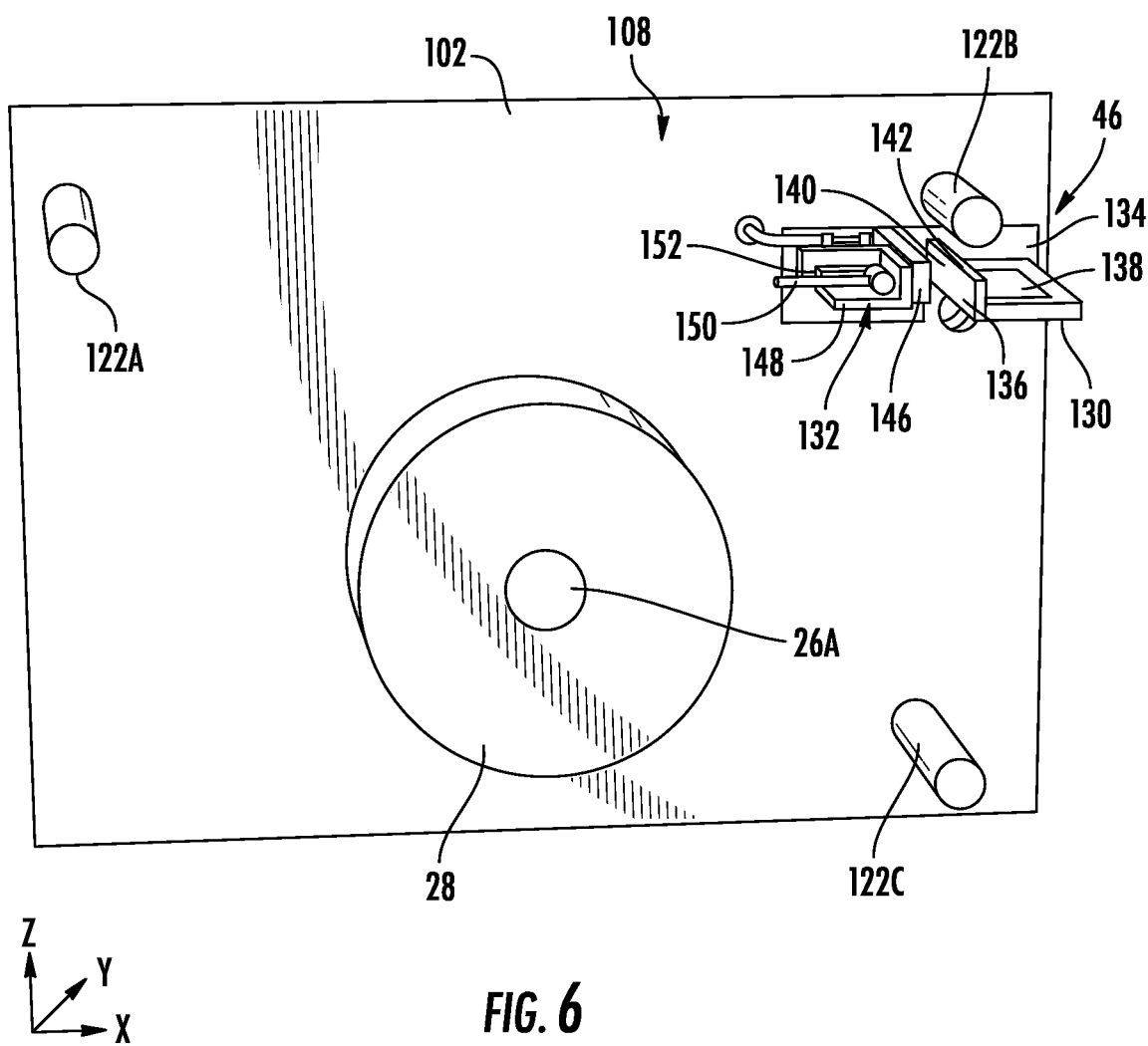
FIG. 6 is a front perspective view of the take-up module having a reclamation system in accordance with various aspects of the present disclosure.
Figure 7:
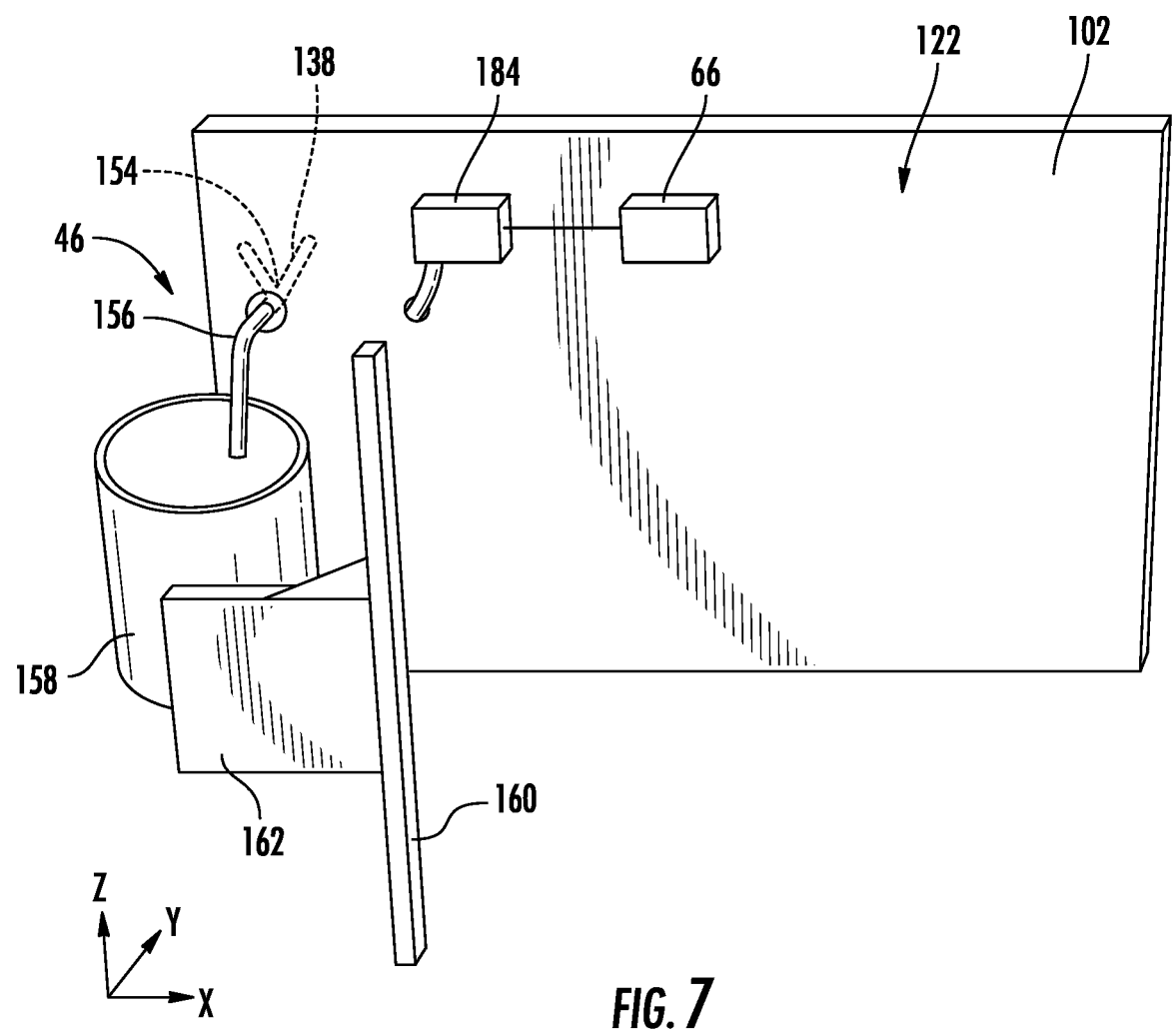
FIG. 7 is a rear perspective view of the take-up module having a reservoir coupled thereto in accordance with various aspects of the present disclosure.

Referring now to FIGS. 6 and 7, respective front and rear perspective views of the reclamation system 46 are illustrated in accordance with exemplary embodiments of the present disclosure. As illustrated, the reclamation system 46 includes the collection structure 130 and a contact assembly 132 that are configured to be positioned on opposing sides 38, 40 (FIG. 1) of the foil 28. In some examples, a brace 134 can fixedly support the collection structure 130. In some embodiments, the brace 134 can allow for adjustment of the reclamation system 46 in the X-axis direction. For instance, the brace 134 may define slotted mounting holes. The slotted mounting holes may allow for adjustment of an amount of deflection and pressure provided by the reclamation system 46 on the foil 28 when pushing on the foil 28. The brace 134 may also be configured to change an angle of incidence of the foil 28 relative to the reclamation system 46 as the foil 28 contracts the reclamation system 46, which can have an impact on the efficiency of the reclamation system 46. Alternatively, each of the collection structure 130 and the contact assembly 132 may be independently coupled with the second panel 102 and/or any other static structure of the apparatus 10. In such instances, each of the collection structure 130 and the contact assembly 132 can be adjusted in a similar manner in the X-axis direction (independently) as described herein. It will be appreciated that movement of the components described herein may be accomplished through the ability to physically adjust them (slotted mounting holes, adjustment screws, and/or any other practicable assembly) and/or via actuators. By providing for adjustment of the reclamation system 46, resin may be removed from the foil 28 without ripping or otherwise damaging the foil 28. In addition, the reclamation system 46 herein may remove the resin from the foil 28 while maintaining the particle size distribution of the slurry of the resin. Still further, the reclamation system 46 may be configured to have minimal adverse effects on the upstream process of the additive manufacturing apparatus 10, such as a printing process being performed by the additive manufacturing apparatus 10.

In various examples, the collection structure 130 may include a scraper 136 that is configured to contact the foil 28 and direct the resin R to a containment vessel 138. In various examples, the scraper 136 may be capable of contacting the foil 28 and/or the resin R provided on the foil 28. Through contact with the foil 28 and/or the resin R, the resin R may be separated from the foil 28 and directed to the containment vessel 138. The scraper 136 may be integrally formed with the collection structure 130 and/or later attached thereto. In various embodiments, the scraper 136 may include a head 140 defining an end segment 142 that may be generally rigid or flexible and is configured to contact the foil 28. The end segment 142 may be of any practicable geometry, thickness, and relative angle to remove at least a portion of the resin R on the foil 28. For example, the scraper 136 may be chamfered. Further, in various examples, the relative angle, which is an angle between the scraper 136 and a foil path, may be any angle between 0 degrees and 180 degrees. In some instances, the scraper 136 may be configured to remove at least 40%, at least 50%, at least 60%, at least 70%, at least 80%, or at least 90% of the remaining resin R as the foil 28 is translated along the end segment 142.

In some embodiments, the contact assembly 132 may be configured to contact or press on the second side 40 (FIG. 1) of the foil 28. For example, in some embodiments, the contact assembly 132 may include a backing plate 146 positioned on an opposing side 40 of the foil 28 from the collection structure 130 and may be configured to apply a force to the opposing side 40 of the foil 28 from the collection structure 130. In various embodiments, both of the scraper 136 and the contact assembly 132 may be deformable or rigid. For example, the contact assembly 132 may be made from a deformable material (e.g. rubber) and the scraper 136 may be formed from a generally rigid material (e.g., a metallic material). Alternatively the contact assembly 132 may be made from a generally rigid material (e.g., a metallic material) and the scraper 136 may be formed from a deformable material (e.g. rubber). Alternatively still, the contact assembly 132 and the scraper 136 may both be formed from a deformable material (e.g. rubber). Still further, the contact assembly 132 and the scraper 136 may be made from a generally rigid material (e.g., a metallic material). It will be appreciated that the amount of force placed on the foil 28 by the backing plate 146 and/or the scraper 136 may be based on the individually design constraints. For example, the design constraints may include a type of foil 28, a thickness of the foil 28, a viscosity of the resin, a loading of the resin, and/or any other design constraint. In various embodiments, each of the backing plate 146 and/or the scraper 136 may apply a force to the foil 28 that is between 0.5 newtons and 5 newtons, 1 newton and 10 newtons, 5 newtons and 25 newtons, 10 newtons and 50 newtons, 15 newtons and 75 newtons, 20 newtons and 100 newtons, any range of newtons between 0.5 newtons and 100 newtons, and/or any other practicable amount of force.

In several embodiments, an anchor plate 148 may be supported by the brace 134 and/or otherwise coupled with the second panel 102. The anchor plate 148 can be operably coupled with the backing plate 146 through a guide 150. The guide 150 may be configured to support movement of the backing plate 146 relative to the anchor plate 148. The backing plate 146 may move between at least a first position in which the backing plate 146 is separated from the foil 28 and/or the scraper 136 and a second position in which the backing plate 146 is translated towards the scraper 136 and/or towards the second side 40 of the foil 28. In some instances, the backing plate 146 may be further coupled with an actuator 152. The actuator 152 may be configured to alter a position of the backing plate 146 relative to the anchor plate 148. In some embodiments, the actuator 152 can also be used to alter the pressure/force that is applied by the backing plate 146. In various instances, the actuator 152 may be configured as a pneumatic, hydraulic, electric, twisted, and coiled polymer (TCP) or supercoiled polymer (SCP), thermal, magnetic, and/or mechanical actuator.

In alternate embodiments, the backing plate 146 may be generally stationary, and the scraper 136 may be translated to contact the foil 28. In such instances, the scraper 136 may be controlled by an actuator, which may be similar to the actuator 152 described above for altering the pressure/force provided on the foil 28. As provided above, the actuator may be configured as a pneumatic, hydraulic, electric, twisted, and coiled polymer (TCP) or supercoiled polymer (SCP), thermal, magnetic, and/or mechanical actuator.

As the resin R is removed by the scraper 136, and, possibly with the assistance of the backing plate 146, the resin R is directed into the containment vessel 138. The containment vessel 138 may include any structure that may maintain and/or direct the resin R to a specified location. For example, the containment vessel 138 may maintain the resin R therein while directing the resin R from the containment vessel 138 through a drain 154. A resin conduit 156 may be operably coupled with the drain 154 and direct the resin R to the reservoir 158. In some examples, the collection structure 130 is support by and positioned on a first side 108 of the second panel 102 and the reservoir 158 is on an opposing second side 112 of the second panel 102.

Figure 8:
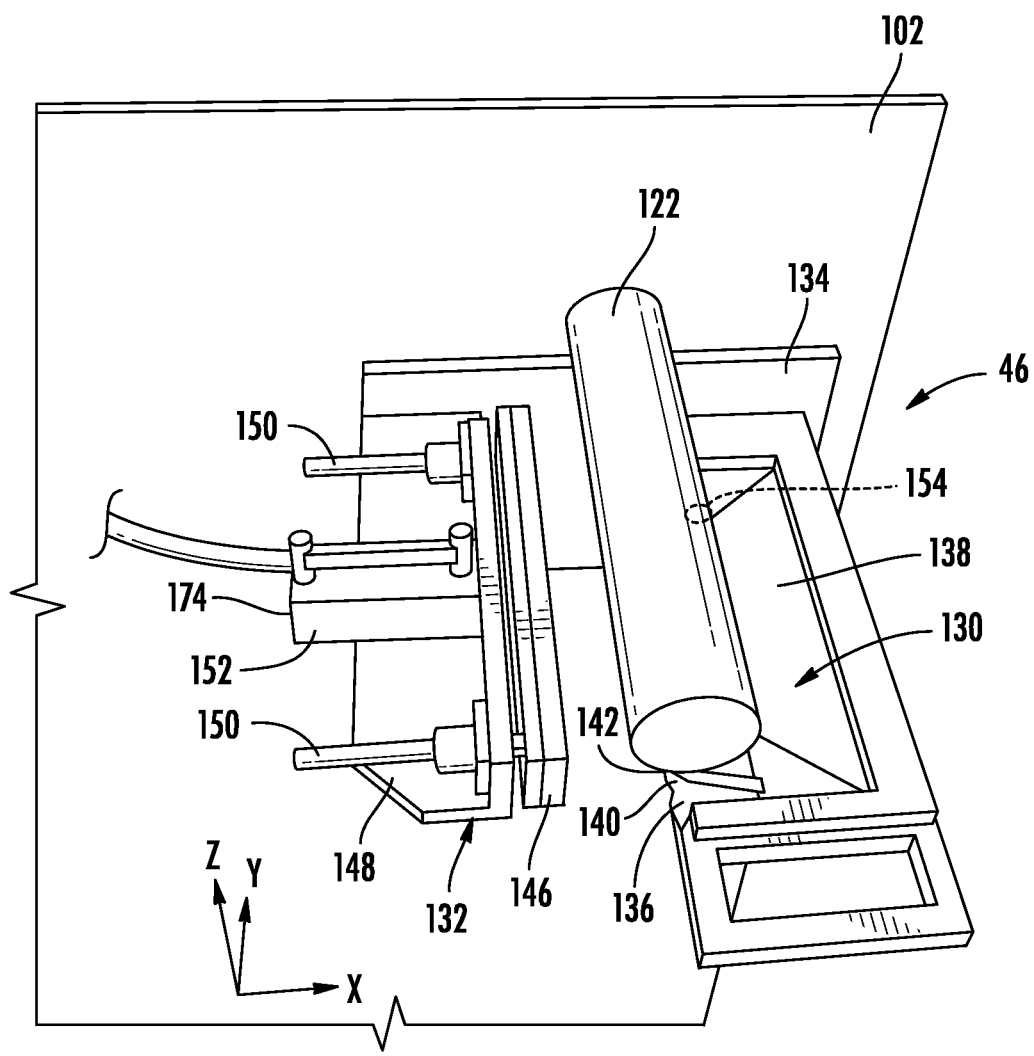
FIG. 8 is a perspective view of the reclamation system in accordance with various aspects of the present disclosure.
Figure 9:
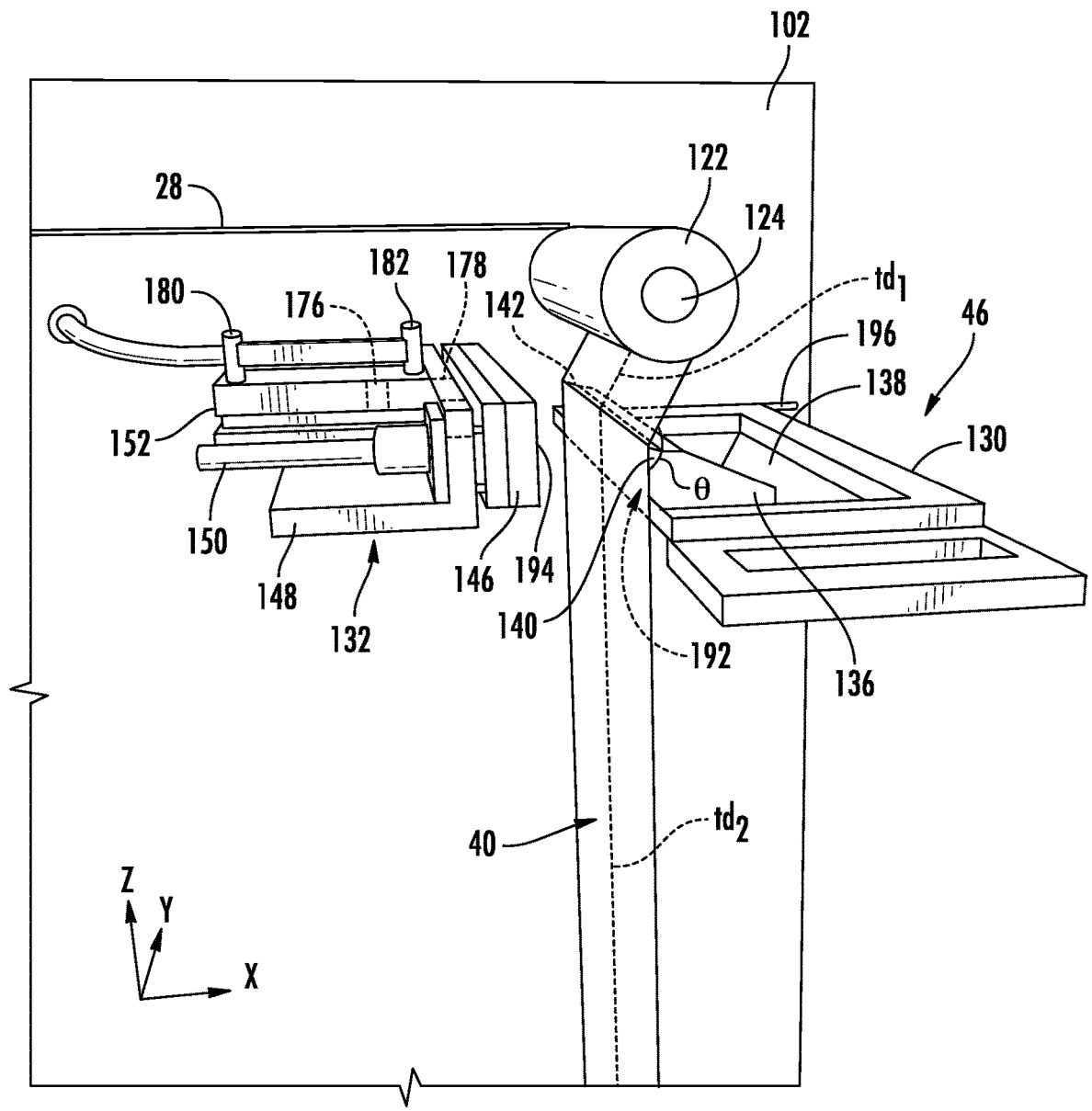
FIG. 9 is a front perspective view of the reclamation system in accordance with various aspects of the present disclosure.

Referring to FIGS. 7-9, perspective views of the reclamation system 46 are illustrated in accordance with exemplary embodiments of the present disclosure. In some embodiments, to effectuate the movement of the backing plate 146 between at least first and second positions, the actuator 152 may be configured as a double acting pneumatic cylinder with a pressure regulator on the extension side to control the backing plate pressure. In some examples, the actuator 152 may include a pneumatic linear actuator that includes a body 174, a piston 176, and a slide 178 or carriage that is operably coupled with the piston and the backing plate 146. The piston 176 is moved by a fluid sent into a chamber that is present on both ends of the piston 176.

First and second valves 180, 182 may be fluidly coupled with the chamber that allows for fluid to be selectively provided to either side of the piston 176 causing the piston 176 to move in response. The movement of the piston 176 also causes the slide 178 to move, which, in turn, moves the backing plate 146. The first and second valves 180, 182 can also have flow control features to be able to adjust the speed at which the backing plate 146 advances and retracts. In such instances, the first and second valves 180, 182 can minimize the risk of cutting the foil 28 or damaging the scraper 136. In various examples, the actuator 152 may be operably coupled with a pneumatic assembly 184 capable of providing a vacuum/suction and/or pushing a fluid, such as air or a process gas (e.g., nitrogen or argon), that causes the backing plate 146 to move between first and second positions. For example, the pneumatic assembly 184 may include a pressurized fluid source that includes a compressor and/or a blower, which may be positioned on a second side 112 of the second panel 102. The pneumatic assembly 184 may additionally or alternatively include any assembly capable of altering a pressure, such as a venturi vacuum pump. In some embodiments, one or more valves and/or switches may be coupled with the pneumatic assembly 184 for varying the states of the pneumatic actuator 152.

With further reference to FIGS. 8 and 9, in operation, the foil 28 is translated from the feed mandrel, through one or more build zones, around one or more rollers 122A, 122B, 122C within the take-up module 26 and to the take-up mandrel 26A (FIG. 6). In some embodiments, such as those illustrated in FIGS. 8 and 9, the reclamation system 46 may be positioned between one of the one or more rollers 122A, 122B, 122C of the take-up module 26 and the take-up mandrel 26A.

In several embodiments, the roller 122 and the scraper 136 may be offset in the X-axis direction. As such, the foil 28 may be positioned about a portion of the roller 122 and directed in a first translational direction $td_1$ upstream of the scraper 136. In some examples, the first translational direction $td_1$ may allow for the foil 28 to be positioned above the collection structure 130 and/or the scraper 136 in the Z-axis direction. Through contact with the scraper 136, the foil 28 may be redirected in a second translational direction $td_2$ that is offset from the first translational direction $td_1$. In some embodiments, an offset angle $\theta$ between the first direction and the second direction may be at an angle $\theta$ that is greater than 0 degrees and less than 180 degrees (e.g., 70-100 degrees) making the first and second directions a non-perpendicular angle. By altering the direction of the foil 28 between the first and second directions, the scraper 136 maintains constant contact with the foil 28 while providing a constant, predetermined force on the foil 28. The predetermined force may be altered through an adjustment assembly 196 that also for translation of the collection structure 130.

In addition to constant contact of the first side 38 of the foil 28 and the scraper 136 through the offset nature of the roller 122 and the collection structure 130, the contact assembly 132 may provide a force on the second side 40 of the foil 28. In various embodiments, the backing plate 146 of the contact assembly 132 and the scraper 136 may each have a planar surface to provide a generally consistent force on the foil 28 positioned between the scraper 136 and the contact assembly 132 while the contact assembly 132 is retained in a predefined position.

Referring to FIGS. 10-15, various perspective views of the reclamation system 46 including a movable scraper 136 are illustrated in accordance with exemplary embodiments of the present disclosure. The movable scraper 136 may allow for efficient removal of the resin R for reuse and/or disposal. In some embodiments, the scraper 136 may be vibrated through ultrasonic energy in addition to or in lieu of mechanical actuation to aid in the removal of the resin R from the foil 28 while applying minimal additional normal forces to the foil 28. For instance, the ultrasonic energy may amplify the forces parallel to the foil 28 to help release the resin R without applying additional strain on the foil 28. It will be appreciated that the amplified force from the ultrasonic movement can provide additional release of various difficult to remove resins R compared to static removal applications.

In some embodiments, the scraper 136 may include a frame 198 that may be operably coupled with the collection structure 130. The frame 198 may support and/or house an actuator 188 (e.g., a transducer 200) that is operably coupled with the head 140. The actuator 188 may be configured to alter a position of the head 140 from a first position to a second position. Additionally and/or alternatively, the transducer 200 may be configured to convert electrical energy to ultrasonic mechanical pressure waves.

In several embodiments in which the head 140 is capable of movement, the transducer 200 may include a shaft 204 that is coupled with a connector 206 and a movement generator 208 on opposing sides thereof. In some instances, the connector 206 may be configured for coupling various heads 140 to the shaft 204. The movement generator 208 may be in the form of an ultrasonic vibrating device such as one utilizing a piezoelectric transducer 200, although alternate movement generating devices are also featured under the present disclosure including, for example, alone or in conjunction with one or the other, fluid, acoustic, motor (e.g., offset cam), reciprocating piston, or other movement assemblies.

The transducer 200 may be operably coupled with a control system 210 that may be further coupled and/or integrated within the computing system 66. The control system 210 may include an ultrasonic signal generator 212 that supplies an electric impulse to the movement generator 208, the voltage of which can be varied at different frequencies and with different waveshapes. The signal may, for example, be a pure sinusoidal wave or may be modulated with one or more other frequencies. Alternatively, the signal may be a stepped or spiked pulse. In some embodiments, the ultrasonic signal generator 212 transmits a signal of between 20-80 kHz. For example, the signal is at about 60 kHz. The signal generator 212 may, for example, transmit a constant amplitude signal at a constant frequency, or alternate one or both of these parameters. A power level can be selected as a percentage of maximum power. In various embodiments, the signal may be transmitted through a cable to the transducer 200 which imparts ultrasonic movement to the head 140.

The end segment 142 of the head 140 is configured to cut through and/or scrape the resin R from the foil 28. It will be appreciated that the end segment 142 of the head 140 may have any practicable geometry. In some examples, the thickness of the end segment 142 of the head 140 may be within the range of from about 0.010 to about 0.050 inches, and possibly within the range of from about 0.015 to about 0.025 inches. The head 140 can be made from hardened base material or have a hard coating applied for a generally long wear lifespan. Further, the body may be designed to provide a controlled directional flow for the reclamation of the resin R. For example, the body 174 may include a base portion 214 and a neck portion 216 extending therefrom. The end segment 142 may be on an opposing side of the neck from the body. The neck portion 216 may have a thickness in the X-axis direction that is less than the thickness of the base portion 214. As such, the resin R may be removed from the foil 28 by the end segment 142 and directed from the neck portion 216 to the base portion 214 and onto the containment vessel 138.

Figure 10:
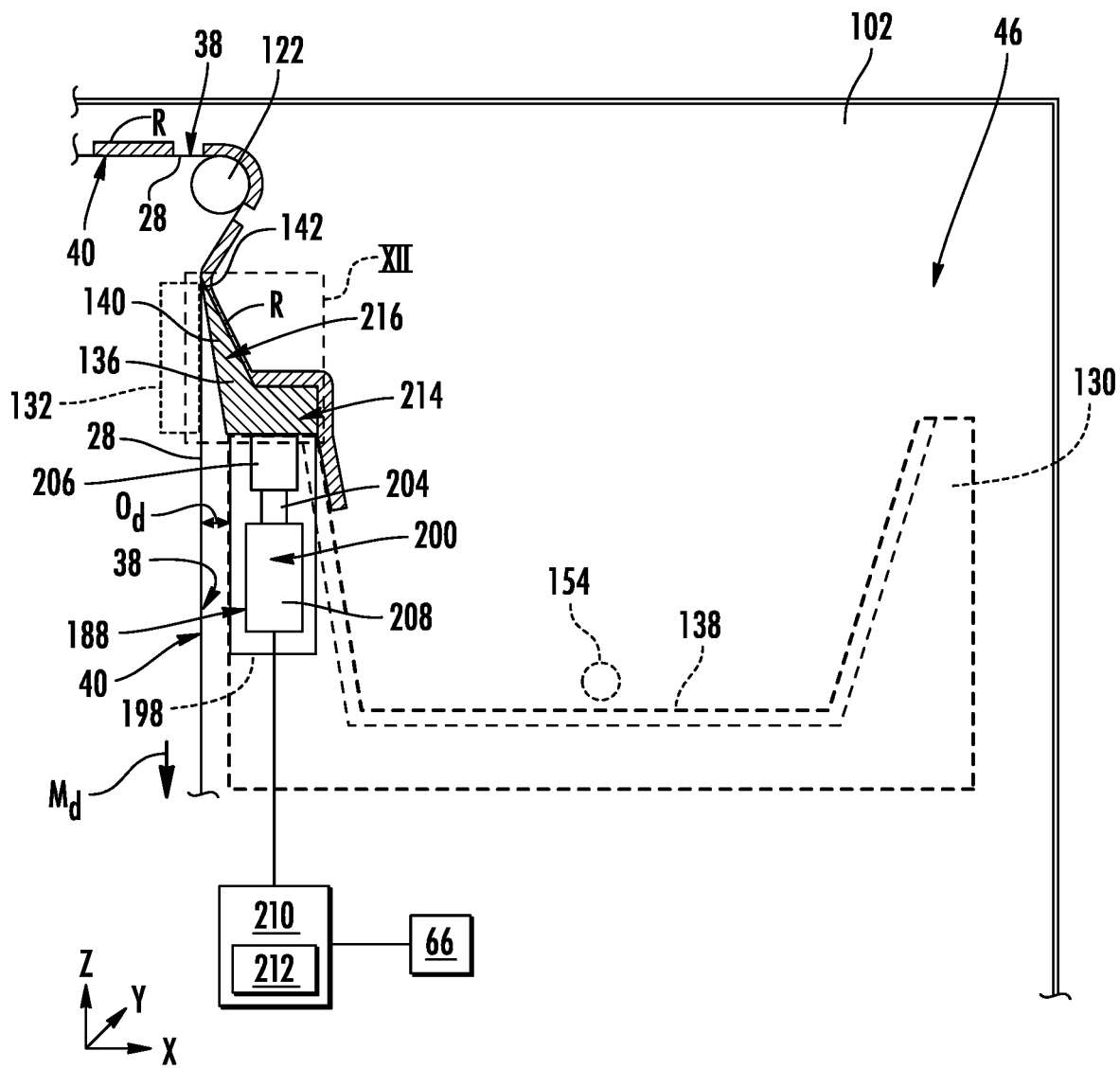
FIG. 10 is a front schematic view of the reclamation system in accordance with various aspects of the present disclosure.
Figure 11:
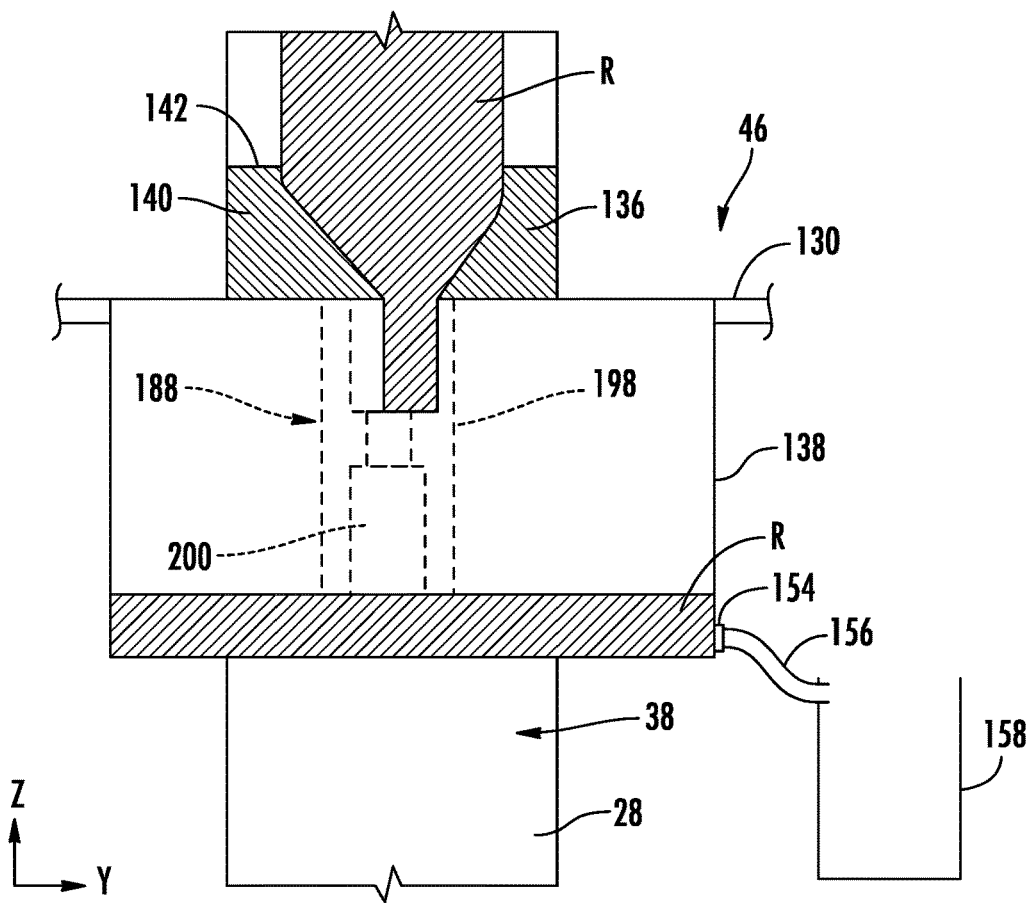
FIG. 11 is a front side schematic view of the reclamation system in accordance with various aspects of the present disclosure.
Figure 12:
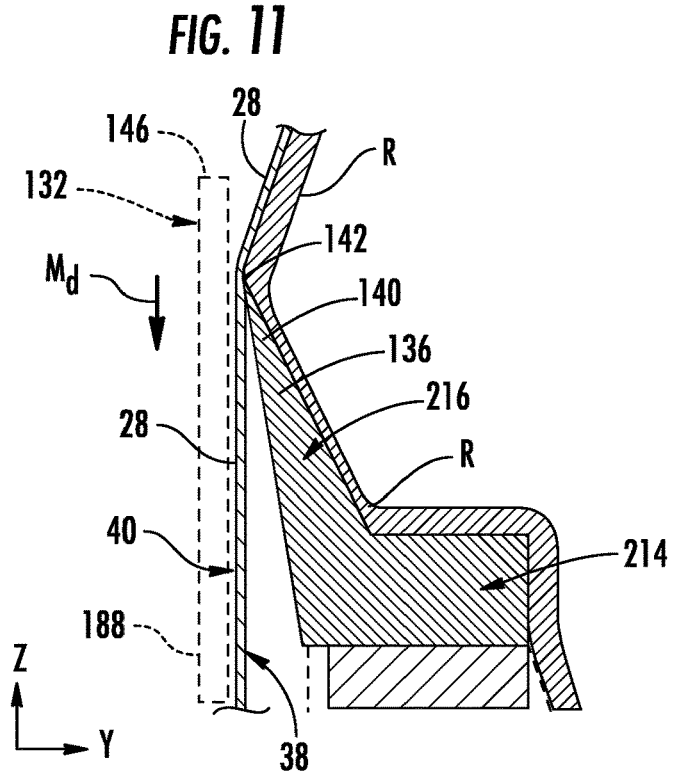
FIG. 12 is an enhanced view of area XII of FIG. 10 illustrating a scraper of the reclamation system in accordance with various aspects of the present disclosure.

In some embodiments, such as those illustrated in FIGS. 10-12, the scraper 136 may have a head 140 that generally moves in a Z-axis direction and/or in a direction that is generally aligned with a movement direction md of the foil 28 to remove the resin R from the foil 28. In such instances, the neck portion 216 may extend towards the foil 28 in the X-axis direction causing the foil 28 to be separated from the collection structure 130 by an offset distance od. In embodiments in which the transducer 200 is configured to move the head 140 in the movement direction md of the foil 28, the transducer 200 may be positioned within the collection structure 130 and/or the scraper 136.

In addition to or in lieu of a transducer operably coupled with the scraper 136, in various embodiments, an actuator 188 (e.g., a transducer) may be operably coupled with the backing plate 146 of the contact assembly 132. The actuator 188 may be configured to alter a position of the backing plate 146 from a first position to a second position. Additionally and/or alternatively, the transducer may be configured to convert electrical energy to ultrasonic mechanical pressure waves. The transducer may be similar to the transducer 200 described and include any or all of the components thereof.

Figure 13:
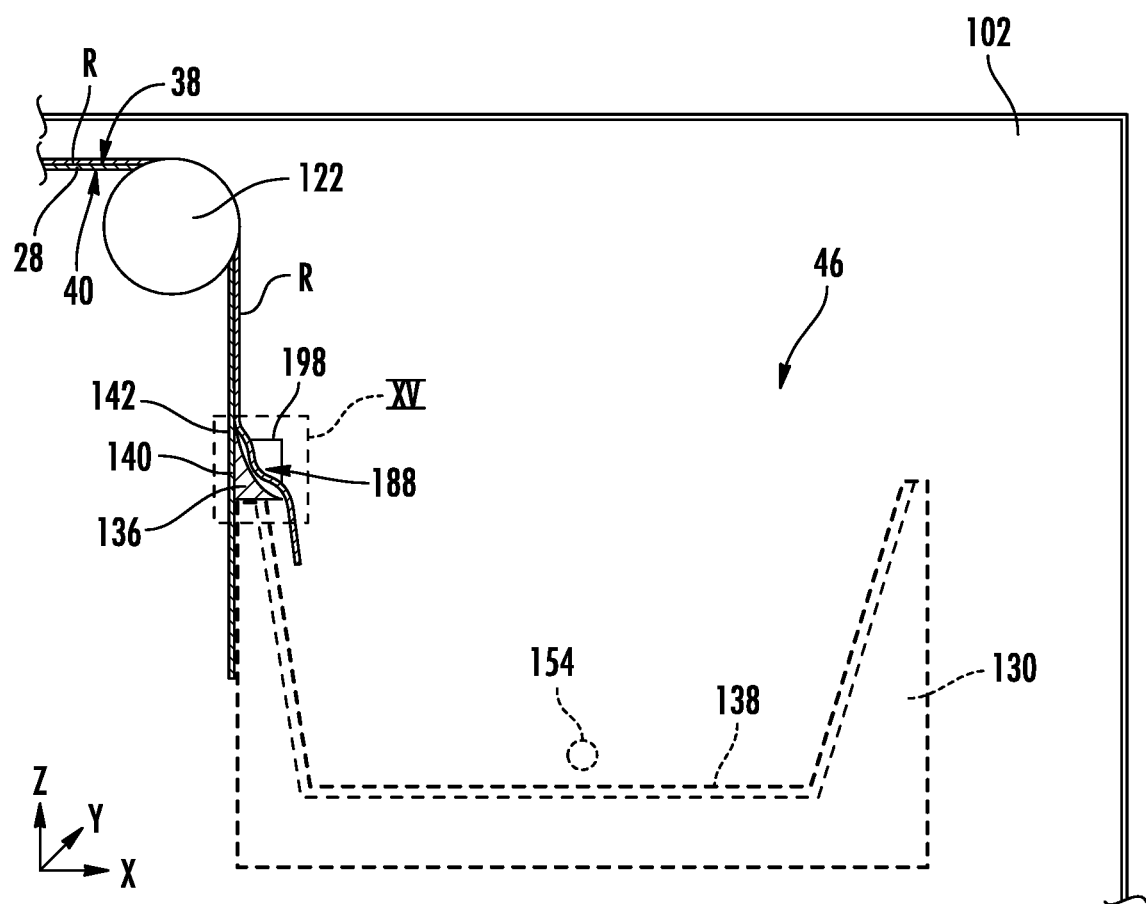
FIG. 13 is a front schematic view of the reclamation system in accordance with various aspects of the present disclosure.
Figure 14:
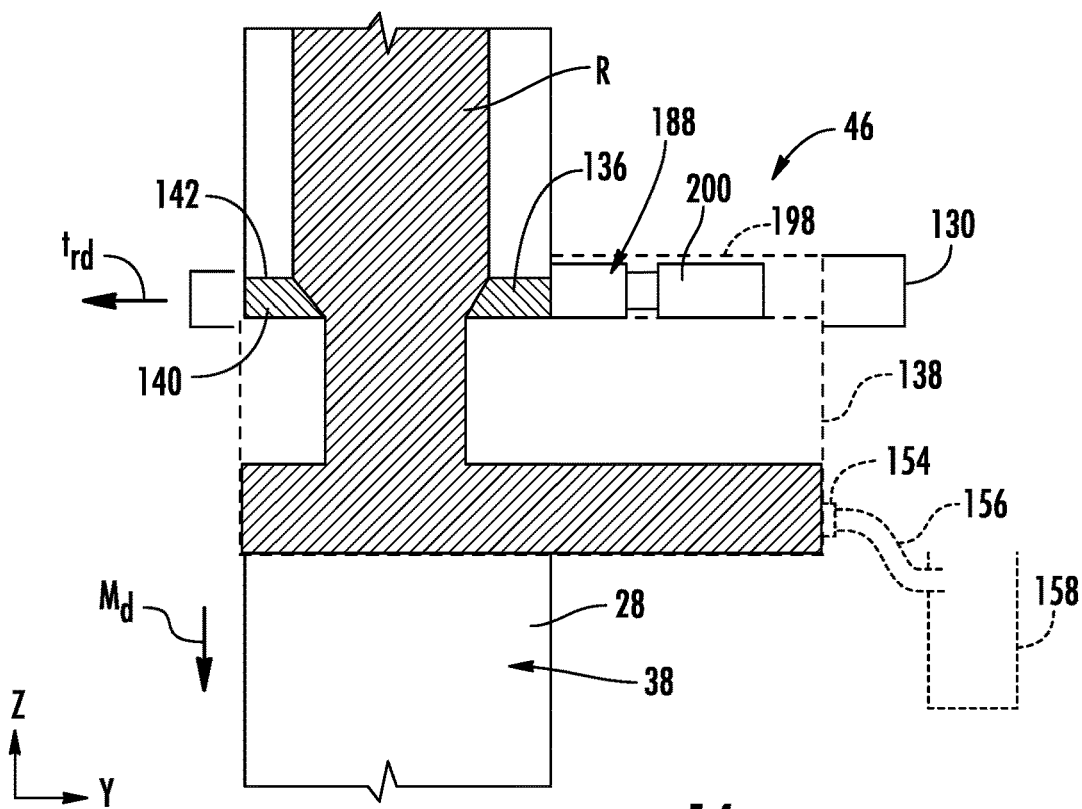
FIG. 14 is a front side schematic view of the reclamation system in accordance with various aspects of the present disclosure.
Figure 15:
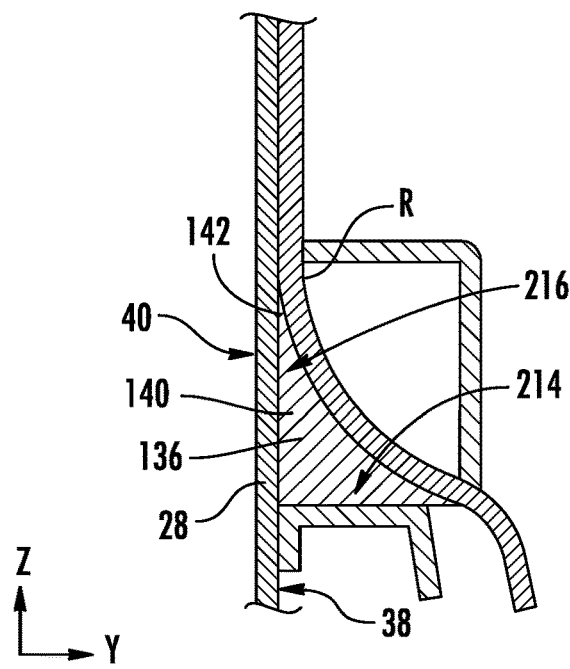
FIG. 15 is an enhanced view of area XV of FIG. 13 illustrating a scraper of the reclamation system in accordance with various aspects of the present disclosure.

Additionally or alternatively, in various embodiments, such as those illustrated in FIGS. 13-15, the head 140 may generally move in a transverse direction trd that is generally parallel to the Y-axis direction and/or a direction that is transverse to the movement direction md of the foil 28. In such instances, the base portion 214 and the neck portion 216 may be generally aligned along the Z-axis direction such that the foil 28 contacts both the neck portion 216 and the base portion 214 as the foil 28 is translated along the scraper 136. In embodiments in which the transducer 200 is configured to move the head 140 in a direction trd that is generally transverse to the movement direction and of the foil 28, the transducer 200 may be positioned above the containment vessel 138 in the Z-axis direction.

Now that the construction and configuration of the additive manufacturing apparatus having one or more accumulators have been described according to various examples of the present subject matter, a method 300 for operating an additive manufacturing apparatus is provided. The method 300 can be used to operate the additive manufacturing apparatus and the one or more accumulators, or any other suitable additive manufacturing apparatus having any type and configuration of positioning assembly. It should be appreciated that the example method 300 is discussed herein only to describe example aspects of the present subject matter, and is not intended to be limiting.

Figure 16:
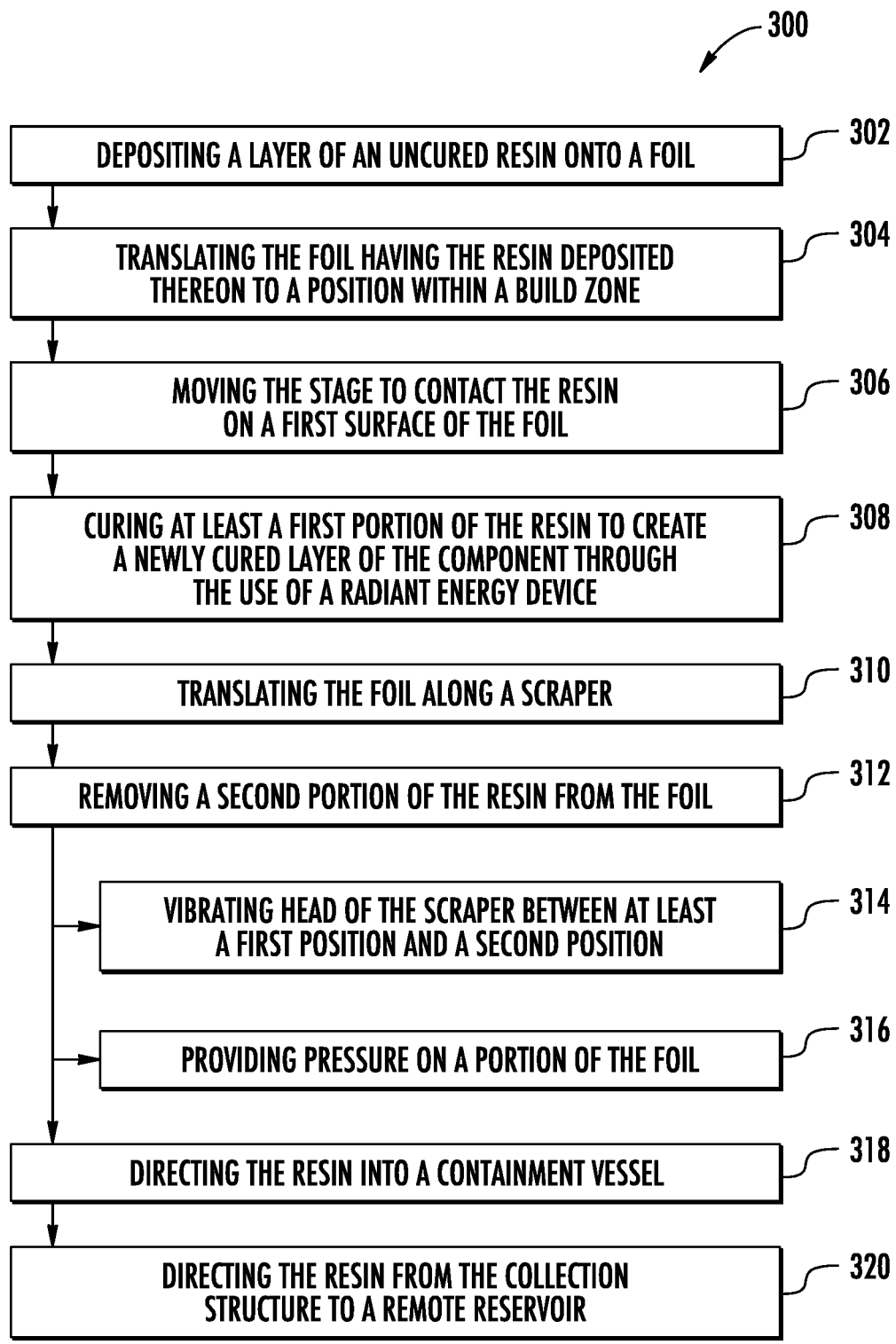
FIG. 16 is a method of operating the manufacturing apparatus in accordance with various aspects of the present disclosure.

Referring now to FIG. 16, the method 300 includes, at step 302, depositing a layer of an uncured resin onto a foil. As provided herein, a material depositor may be positioned along the foil and is operable to apply a layer of resin R over the foil. At step 304, the method includes translating the foil having the resin deposited thereon to a position within a build zone.

At step 306, the method can include moving the stage to contact the resin on a first side of the foil, and, at step 308, the method includes curing at least a first portion of the resin to create a newly cured layer of the component through the use of a radiant energy device. Once the first portion of the resin is cured, the stage may be moved away from the foil thereby separating the component.

At step 310, the method can include translating the foil along a scraper. The scraper may be configured to remove at least a portion of the resin that remains on the foil after the foil has been translated out of the build zone. In some instances, at step 312, the method can include removing a second portion of the resin from the foil. In some embodiments, at step 314, the method includes removing the resin by vibrating head of the scraper between at least a first position and a second position. The head may be vibrated through an actuator and/or a transducer that is operably coupled with the head. The actuator may be configured to alter a position of the head from a first position to a second position. Additionally and/or alternatively, the transducer may be configured to convert electrical energy to mechanical pressure waves through an ultrasonic movement generator. In some embodiments including a transducer, the method can further include vibrating the head of the scraper by converting electrical energy to mechanical pressure waves through the ultrasonic movement generator operably coupled with the transducer.

In some embodiments, the method, at step 316, can include providing pressure on a portion of the foil. In some instances, the pressure may be provided through an actuable backing plate that is movable between at least first and second positions. The head of the scraper is configured to contact a first side of the foil and the backing plate is configured to contact a second, opposing surface of the foil. In the first position, the backing plate may be separated from the second side of the foil and, in the second position, the backing plate may be in contact with the second side of the foil. In some embodiments, to effectuate the movement of the backing plate between at least first and second positions, the actuator may include a pneumatic linear actuator.

Additionally or alternatively, in some instances, the pressure may be provided through an actuable scraper that is movable between at least first and second positions. The head of the scraper is configured to contact a first side of the foil and a generally stationary backing plate is configured to contact a second, opposing surface of the foil. In the first position, the scraper may be separated from the backing plate by a first distance and, in the second position, the scraper may be separated from the backing plate by a second distance that is less than the first distance. In some embodiments, to effectuate the movement of the scarper between at least the first and second positions, the actuator may include a pneumatic linear actuator.

Once removed by the scraper, at step 318, the method includes directing the resin into a containment vessel. The containment vessel may define a drain. At step 320, the method includes directing the resin from the collection structure to a remote reservoir, which may be accomplished through gravity assistance. The remote reservoir is separated from the containment vessel and may be fluidly coupled with the reservoir through a resin conduit. From the reservoir, the resin may be returned to a material depositor and/or removed from the apparatus as waste.

Figure 17:
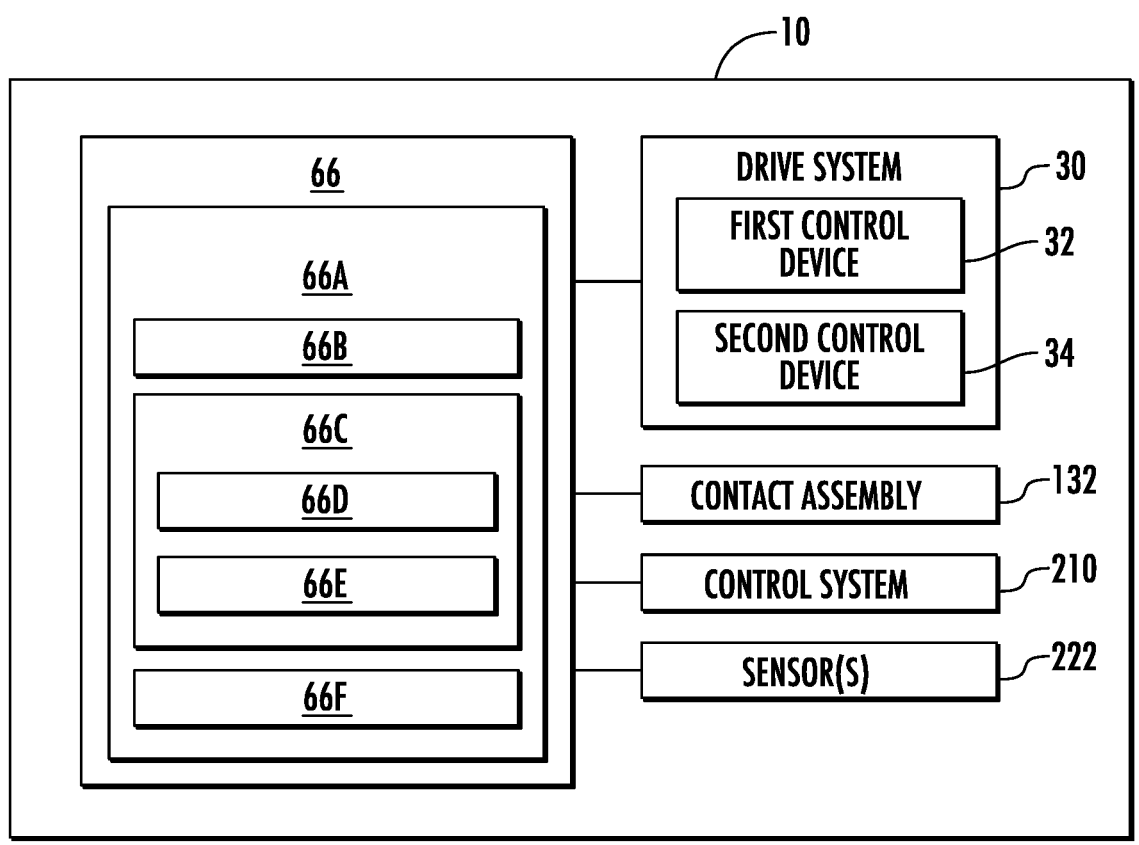
FIG. 17 depicts an exemplary computing system for an additive manufacturing apparatus in accordance with various aspects of the present disclosure.

FIG. 17 depicts certain components of the computing system 66 according to example embodiments of the present disclosure. The computing system 66 can include one or more computing device(s) 66A which may be used to implement the method 300 such as described herein. The computing device(s) 66A can include one or more processor(s) 66B and one or more memory device(s) 66C. The one or more processor(s) 66B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 66C can include one or more non-transitory computer-readable storage medium(s), such as RAM, ROM, EEPROM, EPROM, flash memory devices, magnetic disks, etc., and/or combinations thereof.

The memory device(s) 66C can include one or more computer-readable media and can store information accessible by the one or more processor(s) 66B, including instructions 66D that can be executed by the one or more processor(s) 66B. The instructions 66D may include one or more steps of the method 300 described above, such as to execute operations of the additive manufacturing apparatus 10 described above. For instance, the memory device(s) 66C can store instructions 66D for running one or more software applications, displaying a user interface, receiving user input, processing user input, etc. In some implementations, the instructions 66D can be executed by the one or more processor(s) 66B to cause the one or more processor(s) 66B to perform operations, e.g., such as one or more portions of methods described herein. The instructions 66D can be software written in any suitable programming language or can be implemented in hardware. Additionally, and/or alternatively, the instructions 66D can be executed in logically and/or virtually separate threads on processor(s) 66B.

The one or more memory device(s) 66C can also store data 66E that can be retrieved, manipulated, created, or stored by the one or more processor(s) 66B. The data 66E can include, for instance, data to facilitate performance of the method 300 described herein. The data 66E can be stored in one or more database(s). The one or more database(s) can be connected to computing system 66 by a high bandwidth LAN or WAN, or can also be connected to the computing system 66 through network(s) (not shown). The one or more database(s) can be split up so that they are located in multiple locales. In some implementations, the data 66E can be received from another device.

The computing device(s) 66A can also include a communication module or interface 66F used to communicate with one or more other component(s) of computing system 66 or the additive manufacturing apparatus 10 over the network(s). The communication interface 66F can include any suitable components for interfacing with one or more network(s), including, for example, transmitters, receivers, ports, controllers, antennas, or other suitable components.

As provided herein, the computing system 66 may be operably coupled with one or more of the drive system 30, the contact assembly 132, the control system 210. The computing system 66 may be configured to control the actuation of each of the drive system 30 based on the information from one or more sensors 222. Likewise, the computing system 66 may be operably coupled with the contact assembly 132 to apply a pressure to a surface of the foil 28, and/or the control system 210 to move the head 140 of the scraper 136.

It should be appreciated that the additive manufacturing apparatus is described herein only for the purpose of explaining aspects of the present subject matter. In other example embodiments, the additive manufacturing apparatus may have any other suitable configuration and may use any other suitable additive manufacturing technology. Further, the additive manufacturing apparatus and processes or methods described herein may be used for forming components using any suitable material. For example, the material may be plastic, metal, concrete, ceramic, polymer, epoxy, photopolymer resin, or any other suitable material that may be embodied in a layer of slurry, resin, or any other suitable form of sheet material having any suitable consistency, viscosity, or material properties. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt-based superalloys (e.g., those available under the name Inconel® available from Special Metals Corporation). These materials are examples of materials suitable for use in the additive manufacturing processes described herein, and may be generally referred to as "additive materials."

Aspects of the invention(s) are provided by the subject matter of the following clauses, which are intended to cover all suitable combinations unless dictated otherwise based on logic or the context of the clauses and/or associated figures and description:

A reclamation system for an additive manufacturing apparatus, the reclamation system comprising: a collection structure configured to remove at least a portion of the resin from a foil; a containment vessel configured to retain the resin removed from the foil; and a drain directing the resin from the containment vessel to a reservoir.

The reclamation system of one or more of these clauses, further comprising: a scraper operably coupled with the collection structure and configured to remove the resin from the foil.

The reclamation system of one or more of these clauses, wherein the scraper is configured to vibrate while removing the resin from the foil.

The reclamation system of one or more of these clauses, further comprising: a backing plate positioned on an opposing side of the foil from the collection structure.

The reclamation system of one or more of these clauses, wherein the backing plate selectively provides pressure against the opposing side of the foil from the collection structure.

The reclamation system of one or more of these clauses, further comprising: an anchor plate operably coupled with the backing plate through a guide, the guide configured to support movement of the backing plate relative to the anchor plate.

The reclamation system of one or more of these clauses, further comprising: a pneumatic actuator operably coupled with the backing plate and configured to alter a position of the backing plate relative to the anchor plate.

The reclamation system of one or more of these clauses, further comprising: a brace fixedly supporting each of the anchor plate and the collection structure.

The reclamation system of one or more of these clauses, wherein the backing plate is operably coupled with a transducer, the transducer configured to convert electrical energy to mechanical pressure waves through an ultrasonic movement generator.

The reclamation system of one or more of these clauses, wherein the scraper is configured to contact the foil at an offset angle that is greater than 0 degrees and less than 180 degrees.

The reclamation system of one or more of these clauses, further comprising: a scraper operably coupled with the collection structure, the scraper having a vibrating head operably coupled with a transducer, the transducer configured to convert electrical energy to mechanical pressure waves through an ultrasonic movement generator.

A method of operating an additive manufacturing apparatus, the method comprising: depositing a resin onto a foil; translating the foil within a build zone; curing a first portion of the resin to create a layer of a component; translating the foil along a scraper; and removing a second portion of the resin from the foil by a vibrating head of the scraper.

The method of one or more of these clauses, further comprising: directing the resin into a containment vessel.

The method of one or more of these clauses, further comprising: directing the resin from the containment vessel to a remote reservoir through gravity assistance.

The method of one or more of these clauses, further comprising: providing pressure on a portion of the foil through an actuable backing plate, wherein the head of the scraper is configured to contact a first side of the foil and the backing plate is configured to contact a second, opposing surface of the foil.

The method of one or more of these clauses, further comprising: providing pressure on a portion of the foil through actuation of the scraper.

An additive manufacturing apparatus comprising: a stage configured to hold one or more cured layers of resin that form a component; a radiant energy device operable to generate and project radiant energy in a patterned image; an actuator configured to change a relative position of the stage relative to the radiant energy device; and a reclamation system downstream of the stage and configured to remove at least a portion of the resin from a foil, wherein the reclamation system is configured to redirect the foil from a first translational direction to a second translational direction through contact with a collection structure.

The additive manufacturing apparatus of one or more of these clauses, wherein the collection structure includes a scraper that is configured to contact the foil and direct the resin to a containment vessel.

The additive manufacturing apparatus of one or more of these clauses, further comprising: a containment vessel within the collection structure.

The additive manufacturing apparatus of one or more of these clauses, further comprising: a drain defined by the containment vessel and configured to direct the resin from the containment vessel to a reservoir.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A reclamation system for an additive manufacturing apparatus, the reclamation system comprising:
   a collection structure configured to remove at least a portion of a resin from a foil;
   a containment vessel configured to retain the resin removed from the foil;
   a drain directing the resin from the containment vessel to a reservoir; and
   a backing plate positioned on an opposing side of the foil from the collection structure, wherein the backing plate selectively provides pressure against the opposing side of the foil from the collection structure.

2. The reclamation system of claim 1, further comprising:
   a scraper operably coupled with the collection structure and configured to remove the resin from the foil.

3. The reclamation system of claim 2, wherein the scraper is configured to vibrate while removing the resin from the foil.

4. The reclamation system of claim 1, further comprising:
   an anchor plate operably coupled with the backing plate through a guide, the guide configured to support movement of the backing plate relative to the anchor plate.

5. The reclamation system of claim 4, further comprising:
   a pneumatic actuator operably coupled with the backing plate and configured to alter a position of the backing plate relative to the anchor plate.

6. The reclamation system of claim 4, further comprising:
   a brace fixedly supporting each of the anchor plate and the collection structure.

7. The reclamation system of claim 1, wherein the backing plate is operably coupled with a transducer, the transducer configured to convert electrical energy to mechanical pressure waves through an ultrasonic movement generator.

8. The reclamation system of claim 1, wherein a scraper is configured to contact the foil at an offset angle that is greater than 0 degrees and less than 180 degrees.

9. The reclamation system of claim 1, further comprising:
   a scraper operably coupled with the collection structure, the scraper having a vibrating head operably coupled with a transducer, the transducer configured to convert electrical energy to mechanical pressure waves through an ultrasonic movement generator.

10. An additive manufacturing apparatus comprising:
    a stage configured to hold one or more cured layers of resin that form a component;
    a radiant energy device operable to generate and project radiant energy in a patterned image;
    an actuator configured to change a relative position of the stage relative to the radiant energy device;
    a reclamation system downstream of the stage and configured to remove at least a portion of the resin from a foil, wherein the reclamation system including a scraper;
    a first roller directing the foil partially therearound upstream of the scraper; and
    a second roller directing the foil partially therearound downstream of the scraper, wherein the scraper is configured to redirect the foil from a first translational direction to a second translational direction between the first roller and the second roller.

11. The additive manufacturing apparatus of claim 10, wherein the collection structure includes a scraper that is configured to contact the foil and direct the resin to a containment vessel.

12. The additive manufacturing apparatus of claim 10, further comprising:
    a containment vessel within the collection structure.

13. The additive manufacturing apparatus of claim 12, further comprising:
    a drain defined by the containment vessel and configured to direct the resin from the containment vessel to a reservoir.

* * * * *